United States Patent
Bagherinezhad et al.

(10) Patent No.: US 10,691,975 B2
(45) Date of Patent: Jun. 23, 2020

(54) LOOKUP-BASED CONVOLUTIONAL NEURAL NETWORK

(71) Applicant: XNOR.ai, Inc., Seattle, WA (US)

(72) Inventors: Hessam Bagherinezhad, Seattle, WA (US); Ali Farhadi, Seattle, WA (US); Mohammad Rastegari, Bothell, WA (US)

(73) Assignee: XNOR.AI, INC., Seattle, WA (US)

(*) Notice: Subject to any disclaimer, the term of this patent is extended or adjusted under 35 U.S.C. 154(b) by 154 days.

(21) Appl. No.: 16/038,083

(22) Filed: Jul. 17, 2018

(65) Prior Publication Data

US 2019/0026600 A1    Jan. 24, 2019

Related U.S. Application Data

(60) Provisional application No. 62/534,401, filed on Jul. 19, 2017.

(51) Int. Cl.
*G06K 9/62* (2006.01)
*G06N 3/08* (2006.01)
(Continued)

(52) U.S. Cl.
CPC ....... *G06K 9/6255* (2013.01); *G06K 9/00624* (2013.01); *G06K 9/6256* (2013.01);
(Continued)

(58) Field of Classification Search
CPC ............. G06K 9/6255; G06K 9/00624; G06K 9/6271; G06K 9/6256; G06K 9/6262; G06N 3/0454; G06N 3/063; G06N 3/084
See application file for complete search history.

(56) References Cited

U.S. PATENT DOCUMENTS

| 10,546,237 | B2* | 1/2020 | Heifets | G06N 3/0454 |
| 2016/0259898 | A1* | 9/2016 | Kim | A61B 8/4444 |

(Continued)

OTHER PUBLICATIONS

J. Long, et al ("Fully Convolutional Networks for Semantic Segmentation", Proceedings of the IEEE Conference on Computer Vision and Pattern Recognition, pp. 3431-3440) (Year: 2015).*

(Continued)

*Primary Examiner* — Amara Abdi
(74) *Attorney, Agent, or Firm* — Morgan, Lewis & Bockius LLP

(57) ABSTRACT

Systems and methods are disclosed for lookup-based convolutional neural networks. For example, methods may include applying a convolutional neural network to image data based on an image to obtain an output, in which a layer of the convolutional network includes filters with weights that are stored as a dictionary (D) of channel weight vectors, a respective lookup index tensor (I) that indexes the dictionary, and a respective lookup coefficient tensor (C), and in which applying the convolutional neural network includes: convolving the channel weight vectors of the dictionary (D) with an input tensor based on the image to obtain an input dictionary (S), and combining entries of the input dictionary (S) that are indexed with indices from the respective lookup index tensor (I) and multiplied with corresponding coefficients from the respective lookup coefficient tensor (C); and storing, displaying, or transmitting data based on the output of the convolutional neural network.

20 Claims, 8 Drawing Sheets

(51) Int. Cl.
G06N 3/063 (2006.01)
G06N 3/04 (2006.01)
G06K 9/00 (2006.01)
(52) U.S. Cl.
CPC ......... G06K 9/6262 (2013.01); G06K 9/6271 (2013.01); G06N 3/0454 (2013.01); G06N 3/063 (2013.01); G06N 3/084 (2013.01)

(56) References Cited

U.S. PATENT DOCUMENTS

| | | | | |
|---|---|---|---|---|
| 2018/0032844 | A1* | 2/2018 | Yao | G06K 9/00362 |
| 2018/0129893 | A1* | 5/2018 | Son | G06K 9/00979 |
| 2018/0182083 | A1* | 6/2018 | Natroshvili | G06N 3/0454 |
| 2018/0285715 | A1* | 10/2018 | Son | G06N 3/08 |

OTHER PUBLICATIONS

"LCNN: Lookup-Based Convolutional Neural Network," by Hessam Bagherinezhad, Mohammad Rastegari, Ali Farhadi, University of Washington, XNOR.AI, Allen Institute for AI, Nov. 20, 2016.
"About—Oculus Rift—Virtual Reality Headset for 3d Gaming." V. Oculus. URL: http://www.oculusvr.com, Jun. 9, 2012.
"Attribute-Based Classification for Zero-Shot Visual Object Categorization." C. H. Lampert, H. Nickisch, and S. Harmeling. IEEE Transactions on Pattern Analysis and Machine Intelligence, 36(3): pp. 453-465, 2014.
"AUGEM: Automatically Generate High Performance Dense Linear Algebra Kernels on x86 CPUs." Q. Wang, X. Zhang, Y. Zhang, and Q. Yi. In Proceedings of the International Conference on High Performance Computing, Networking, Storage and Analysis, 2013.
"BinaryConnect: Training Deep Neural Networks with Binary Weights During Propagations." M. Courbariaux, Y. Bengio, and J.-P. David.: In Advances in Neural Information Processing Systems, pp. 3105-3113, 2015.
"BinaryNet: Training Deep Neural Networks with Weights and Activations constrained to +1 or −1." M. Courbariaux and Y. Bengio. CoRR, Feb. 9, 2016.
"Bitwise Neural Networks." M. Kim and P. Smaragdis. Proceeding of the $31^{st}$ International Conference on Machine Learning, JMLR: W&CP vol. 37, 2015.
"Compressing Deep Convolutional Networks Using Vector Quantization." Y. Gong, L. Liu, M. Yang, and L. Bourdev. Under review as a Conference Paper at ICLR 2015.
"Compressing Neural Networks with the Hashing Trick." W. Chen, J. T. Wilson, S. Tyree, K. Q. Weinberger, and Y. Chen. In ICML, Apr. 19, 2015.
"Data-Free Parameter Pruning for Deep Neural Networks." S. Srinivas and R. V. Babu. In British Machine Vision Conference (BMVC), Jul. 22, 2015.
"Deep Compression: Compressing Deep Neural Network with Pruning, Trained Quantization and Huffman Coding." S. Han, H. Mao, and W. J. Daily. In ICLR, 2015.
"Deep Fried Convnets." Z. Yang, M. Moczulski, M. Denil, N. de Freitas, A. Smola, L. Song, and Z. Wang. In ICCV, Jul. 17, 2015.
"Deep Residual Learning for Image Recognition." K. He, X. Zhang, S. Ren, and J. Sun, Dec. 10, 2015.
"Efficient and Accurate Approximations of Nonlinear Convolutional Networks." X. Zhang, J. Zou, X. Ming, K. He, and J. Sun. In CVPR, 2015.
"Exploiting Linear Structure Within Convolutional Networks for Efficient Evaluation." E. L. Denton, W. Zaremba, J. Bruna, Y. LeCun, and R. Fergus. In NIPS, Jun. 9, 2014.
"Fast R-CNN" R. Girshick. In Proceedings of the IEEE International Conference on Computer Vision, pp. 1440-1448, Sep. 27, 2015.
"Faster R-CNN: Towards Real-Time Object Detection with Region Proposal Networks." S. Ren, K. He, R. Girshick, and J. Sun. In Advances in Neural Information Processing Systems, pp. 91-99, 2015.

"First Post on Oculus! Oculus Rift—Virtual Reality Headset for 3d Gaming." V. Oculus. URL: http://www.oculusvr.com, Jun. 9, 2012.
"Fixed Point Optimization of Deep Convolutional Neural Networks for Object Recognition." S. Anwar, K. Hwang, and W. Sung.: In Acoustics, Speech and Signal Processing (ICASSP), 2015 IEEE International Conference on, pp. 1131-1135. IEEE, 2015.
"Fixed-Point Feedforward Deep Neural Network Design Using Weights+ 1, 0, and−1." K. Hwang and W. Sung. In Signal Processing Systems (SiPS), 2014 IEEE Workshop on, pp. 1-6. IEEE, 2014.
"From Generic to Specific Deep Representations for Visual Recognition." H. Azizpour, A. Sharif Razavian, J. Sullivan, A. Maki, and S. Carlsson. In Proceedings of the IEEE Conference on Computer Vision and Pattern Recognition Workshops, pp. 36-45, 2015.
"Fully Convolutional Networks for Semantic Segmentation." J. Long, E. Shelhamer, and T. Darrell. In Proceedings of the IEEE Conference on Computer Vision and Pattern Recognition, pp. 3431-3440, 2015.
"Going Deeper with Convolutions." C. Szegedy, W. Liu, Y. Jia, P. Sermanet, S. Reed, D. Anguelov, D. Erhan, V. Vanhoucke, and A. Rabinovich. In Proceedings of the IEEE Conference on Computer Vision and Pattern Recognition, pp. 1-9, 2015.
"ImageNet Classification with Deep Convolutional Neural Networks." A. Krizhevsky, I. Sutskever, and G. E. Hinton. In Proceedings of the $25^{th}$ International Conference on Neural Information Processing Systems. pp. 1097-1105, Dec. 2012.
"ImageNet: A Large-Scale Hierarchical Image Database." J. Deng, W. Dong, R. Socher, L.-J. Li, K. Li, and L. Fei-Fei. In CVPR09, Jun. 2009.
"Improving the Speed of Neural Networks on CPUs." V. Vanhoucke, A. Senior, and M. Z. Mao. In Deep Learning and Unsupervised Feature Learning NIPS Workshop, 2011.
"Is Learning the n-th Thing any Easier than Learning the First?" S. Thrum. Advances in neural information processing systems, pp. 640-646, 1996.
"Learning Both Weights and Connections for Efficient Neural Network." S. Han, J. Pool, J. Tran, and W. Daily. In Advances in Neural Information Processing Systems, pp. 1135-1143, 2015.
"Learning Structured Sparsity in Deep Neural Networks." W. Wen, C. Wu, Y. Wang, Y. Chen, and H. Li. In NIPS, Oct. 18, 2016.
"Learning to Segment Object Candidates." P. O. Pinheiro, R. Collobert, and P. Dollar. In Advances in Neural Information Processing Systems, pp. 1990-1998, Sep. 1, 2015.
"Low-Shot Visual Object Recognition." B. Hariharan and R. Girshick, Jun. 9, 2016.
"Matching Networks for One Shot Learning." O. Vinyals, C. Blundell, T. Lillicrap, K. Kavukcuoglu, and D. Wierstra, Dec. 29, 2017.
"Merging Reality and Virtuality with Microsoft HoloLens." M. Gottmer. 2015. 1.
"Neural Networks with Few Multiplications." Z. Lin, M. Courbariaux, R. Memisevic, and Y. Bengio. Published as a conference paper at ICLR Feb. 26, 2016.
"Oculus Rift—Virtual Reality Headset for 3d Gaming." V. Oculus. URL: http://www.oculusvr.com, Jun. 9, 2012.
"One-Shot Learning of Object Categories." L. Fei-Fei, R. Fergus, and P. Perona. IEEE Transactions on Pattern Analysis and Machine Intelligence, vol. 28, No. 4, pp. 594-611, Feb. 14, 2006.
"Predicting Deep Zero-Shot Convolutional Neural Networks using Textual Descriptions." J. L. Ba, K. Swersky, S. Fidler, R. Salakhutdinov, University of Toronto. In Proceedings of the IEEE International Conference on Computer Vision, pp. 4247-4255, Sep. 25, 2015.
"Predicting Parameters in Deep Learning." M. Denil, B. Shakibi, L. Dinh, M. Ranzato, and N. de Freitas. In NIPS, 2013.
"Quantized Convolutional Neural Networks for Mobile Devices." J. Wu, C. Leng, Y. Wang, Q. Hu, and J. Cheng, May 16, 2016.
"Quantized Neural Networks: Training Neural Networks with Low Precision Weights and Activations." I. Hubara, M. Courbariaux, D. Soudry, R. El-Yaniv, and Y. Bengio, Sep. 22, 2016.
"Rich Feature Hierarchies for Accurate Object Detection and Semantic Segmentation." R. Girshick, J. Donahue, T. Darrell, and J. Malik. In Proceedings of the IEEE conference on computer vision and pattern recognition, pp. 580-587, Oct. 22, 2014.

(56) References Cited

OTHER PUBLICATIONS

"Siamese Neural Networks for One-Shot Image Recognition." G. Koch, R. Zemel, and R. Salakhutdinov. Proceedings of the $32^{nd}$ International Conference on Machine Learning, JMLR: W&CP vol. 37, 2015.
"Sparse Convolutional Neural Networks." B. Liu, M. Wang, H. Foroosh, M. Tappen, and M. Pensky. In CVPR, 2015.
"Speeding up Convolutional Neural Networks with Low Rank Expansions." M. Jaderberg, A. Vedaldi, and A. Zisserman, May 15, 2014.
"SqueezeNet: AlexNet-Level Accuracy with 50× Fewer Parameters and <0.5MB Model Size." F. N. Iandola, M. W. Moskewicz, K. Ashraf, S. Han, W. J. Daily, and K. Keutzer. Under review as a conference paper at ICLR 2017.
"The Multiverse Loss for Robust Transfer Learning." E. Littwin and L. Wolf, Dec. 22, 2015.
"Understanding the Difficulty of Training Deep Feedforward Neural Networks." X. Glorot and Y. Bengio. Appearing in Proceedings of the $13^{th}$ International Conference on Artificial Intelligence and Statistics, (AISTATS) vol. 9, pp. 249-256, 2010.
"Very Deep Convolutional Networks for Large-Scale Image Recognition." K. Simonyan and A. Zisserman, Apr. 10, 2015.
"Xnor-Net: ImageNet Classification Using Binary Convolutional Neural Networks." M. Rastegari, V. Ordonez, J. Redmon, and A. Farhadi. In ECCV, Aug. 2, 2016.

* cited by examiner

LOOKUP-BASED CONVOLUTIONAL NEURAL NETWORK

CROSS REFERENCE TO RELATED APPLICATIONS

This application claims the benefit of U.S. Provisional Application No. 62/534,401, filed Jul. 19, 2017, the contents of which is incorporated by reference herein in its entirety.

TECHNICAL FIELD

This disclosure relates to lookup-based convolutional neural networks.

BACKGROUND

In recent years convolutional neural networks (CNN) have played major roles in improving the state of the art across a wide range of problems in computer vision, including image classification, object detection, segmentation, etc. These models are very expensive in terms of computation and memory. For example, AlexNet has 61 million parameters and performs 1.5 billion high precision operations to classify a single image. These numbers are even higher for deeper networks (e.g., the Visual Geometry Group (VGG) networks). The computational burden of learning and inference for these models is significantly higher than what many computing platforms can afford.

SUMMARY

Disclosed herein are implementations of lookup-based convolutional neural networks.

In a first aspect, the subject matter described in this specification can be embodied in systems that include an image sensor configured to capture images; a fastening article attached to the image sensor and configured to mount the image sensor in proximity to a portion of a human body; and a processing apparatus that is configured to, and a processing apparatus that is configured to: access an image captured using the image sensor; apply a convolutional neural network to image data based on the image to obtain an output, in which a layer of the convolutional network includes filters with weights that are stored as a dictionary (D) of channel weight vectors, a respective lookup index tensor (I) that indexes the dictionary, and a respective lookup coefficient tensor (C), and in which applying the convolutional neural network includes convolving the channel weight vectors of the dictionary (D) with an input tensor based on the image to obtain an input dictionary (S), and combining entries of the input dictionary (S) that are indexed with indices from the respective lookup index tensor (I) and multiplied with corresponding coefficients from the respective lookup coefficient tensor (C); an store, display, or transmit data based on the output of the convolutional neural network.

In a second aspect, the subject matter described in this specification can be embodied in methods that include applying a convolutional neural network to image data based on an image to obtain an output, in which a layer of the convolutional network includes filters with weights that are stored as a dictionary (D) of channel weight vectors, a respective lookup index tensor (I) that indexes the dictionary, and a respective lookup coefficient tensor (C), and in which applying the convolutional neural network includes: convolving the channel weight vectors of the dictionary (D) with an input tensor based on the image to obtain an input dictionary (S), and combining entries of the input dictionary (S) that are indexed with indices from the respective lookup index tensor (I) and multiplied with corresponding coefficients from the respective lookup coefficient tensor (C); and storing, displaying, or transmitting data based on the output of the convolutional neural network.

In a third aspect, the subject matter described in this specification can be embodied in a wearable device comprising: a memory; and a processor, wherein the memory stores instructions executable by the processor to cause the wearable device to: apply a convolutional neural network to image data based on an image to obtain an output, in which a layer of the convolutional network includes filters with weights that are stored as a dictionary (D) of channel weight vectors, a respective lookup index tensor (I) that indexes the dictionary, and a respective lookup coefficient tensor (C), and in which applying the convolutional neural network includes: convolving the channel weight vectors of the dictionary (D) with an input tensor based on the image to obtain an input dictionary (S), and combining entries of the input dictionary (S) that are indexed with indices from the respective lookup index tensor (I) and multiplied with corresponding coefficients from the respective lookup coefficient tensor (C); and store, display, or transmit data based on the output of the convolutional neural network.

These and other aspects of the present disclosure are disclosed in the following detailed description, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
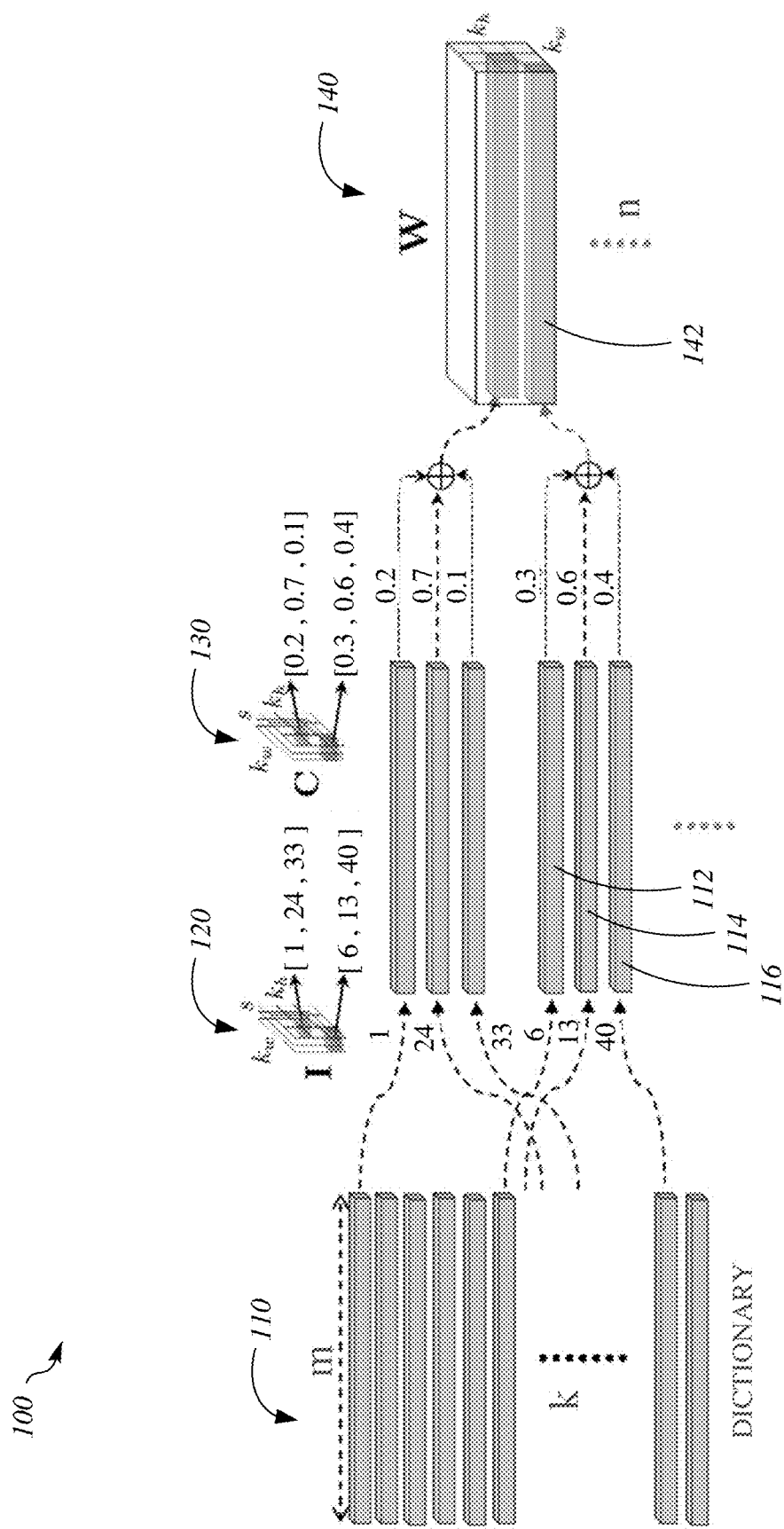
FIG. 1 is a diagram illustrating an example process for constructing a weight filter for a lookup-based convolutional neural network.

This document includes disclosure of systems and methods for lookup-based convolutional neural networks. Porting state of the art deep learning algorithms to resource constrained compute platforms (e.g., Virtual Reality (VR), Augmented Reality (AR), and/or wearables) is extremely challenging. Some implementations utilize a fast, compact, and accurate model for convolutional neural networks that enables efficient learning and inference. Lookup-based convolutional neural network (LCNN) structures are described that encode convolutions by few lookups to a dictionary that is trained to cover the space of weights in convolutional neural networks. For example, training an LCNN may include jointly learning a dictionary and a small set of linear combinations. The size of the dictionary may naturally traces a spectrum of trade-offs between efficiency and accuracy. In experimental results on ImageNet challenge, some implementations of LCNN can offer 3.2× speedup (relative to conventional convolutional neural network structures) while achieving 55:1% top-1 accuracy using AlexNet architecture. Some implementations of LCNN may offer 37.6× speed up over AlexNet while maintaining 44:3% top-1 accuracy. For example, some implementations of LCNN not only offer dramatic speed ups at inference, but may also enables efficient training. Some implementations may provide performance benefits in few-shot learning and few-iteration learning applications, two crucial aspects of on-device training of deep learning models.

Recent advancements in virtual reality (e.g., VR by Oculus), augmented reality (e.g., AR by HoloLens), and smart wearable devices increase the demand for implementing state of the art deep learning algorithms on these portable computing platforms. Porting deep learning methods to these platforms may be challenging mainly due to the gap between what these platforms can offer and what our deep learning methods require. More efficient approaches to deep neural networks may be key to addressing this challenge.

Some recent work on efficient deep learning have focused on model compression and reducing the computational precision of operations in neural networks. CNNs may suffer from over-parametrization and may encode highly correlated parameters, resulting in inefficient computation and memory usage. For example, a key advantage of LCNN based systems and methods may stem from leveraging the correlation between the parameters and representing the space of parameters by a compact set of weight vectors, called a dictionary.

LCNN is a lookup-based convolutional neural network that encodes convolutions by few lookups to a dictionary that is trained to cover the space of weights in CNNs. For example, training LCNN may include jointly learning a dictionary and a small set of linear combinations. The size of the dictionary may naturally trace a spectrum of trade-offs between efficiency and accuracy.

For some implementations, experimental results using AlexNet on the ImageNet challenge show that LCNN can offer 3.2× speedup while achieving 55:1% top-1 accuracy. Some implementations using LCNN may offer 37.6× speed up over traditional CNN structures while maintaining 44:3% top-1 accuracy. In the ResNet-18, some implementations using LCNN may offer 5× speedup with 62.2% accuracy and some implementations using LCNN may offer 29.2× speedup with 51.8% accuracy.

LCNN may also enable efficient training. Much of the prior work in efficient deep learning have focused on efficient inference on resource constrained platforms. Training on these platforms is even more challenging and may entail addressing two major problems: i. few-shot learning (e.g., in a setting of on-device training may dictate that there won't be enough training examples for learning new categories with some CNN architectures). In some cases, training needs to be done with very few training examples. ii. Few-iteration learning: constraints in computation, memory, and/or power may require the training to be light and quick. In some scenarios, hard constraints may be imposed on the number of iterations in training. Some implementations using LCNN may offer solutions for both of these problems in deep on-device training.

Few-shot learning, i.e., the problem of learning novel categories from few examples (sometimes even one example), have been extensively studied in machine learning and computer vision. The topic is, however, relatively new for deep learning, where a key challenge may be to avoid overfitting. The number of parameters may be significantly higher than what can be learned from few examples. Some implementations using LCNN, by virtue of having fewer parameters to learn (e.g., only around 7% of parameters of some networks), may offer a simple solution to this challenge. For example, an LCNN dictionary can be learned offline from training data where enough training examples per category are available. When facing new categories, learning the set of sparse reconstruction weights may be sufficient. For some implementations, experimental evaluations show significant gain in few-shot learning (e.g., 6.3% in one training example per category).

Few-iteration learning is the problem of getting highest possible accuracy in few iterations that a resource constrained computing platform can offer. In a traditional CNN, training may involve hundreds of thousands of iterations. This number may be even higher for recent deeper architectures. Some implementations using LCNN may offer a solution: dictionaries in LCNN may be architecture agnostic and can be transferred across architectures or layers. This feature may enable training a dictionary using a shallow network and transferring it to a deeper network. As before, training to learn are the few reconstruction weights may be sufficient; dictionaries can remain fixed after an initial training in the same network or in a different network. Experimental evaluations on the ImageNet challenge for some implementations show that, using LCNN, an 18-layer ResNet with a pre-trained dictionary from a 10-layer ResNet can be trained to update other lookup parameters and achieve a 16.2% higher top-1 accuracy on 10K iterations.

For example, low precision networks may be used in a resource constrained computing platform at the cost of reduced precision. In some implementations, an LCNN with a fixed-point implementation of 8-bit integer may be used (e.g., instead of with 32-bit floating point activations) to reduce computational complexity. For example, binary networks may achieve relatively strong results on ImageNet. For example, an LCNN may be trained that computes the output with mostly binary operations (e.g., on all layers except for the first and the last layer). For example, a real-valued version of the weights may be used as a key reference for a binarization process. In some implementations, both weights and activations may be binarized. Some implementations retrain a previously trained neural network with binary weights and binary inputs.

The proposed techniques and systems using lookup-based convolutional neural networks may offer advantages over conventional computer vision systems. For example, by replacing floating point computations by lookup up operations, LCNN may reduce computational complexity (e.g., processor cycles consumed) of inference time forward pass processing of images or other signals. For example, by replacing large numbers filter weights for one or more layers of convolutional neural network by a shared dictionary of vectors and a set of lookup index tensors and lookup coefficient tensors, LCNN may reduce data storage requirements (e.g., memory usage) of systems. For example, LCNN may enable direct, in-field, on-device training of a convolutional neural network on resource constrained computing platforms, such as head-mounted displays for virtual reality or augmented reality applications or other wearable devices. Some implementations may provide high-accuracy detection and classification of objects appearing in an image, while meeting real-time processing constraints and/or the constraints of limited hardware platforms (e.g., wearable computing devices, such as augmented reality headsets).

Implementations are described in detail with reference to the drawings, which are provided as examples to enable those skilled in the art to practice the disclosed technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

FIG. 1 is a diagram illustrating an example process 100 for constructing a weight filter for a lookup-based convolutional neural network. In CNN, a convolutional layer consists of n cubic weight filters of size $m \times k_w \times k_h$, where m and n are the number of input and output channels, respectively, and $k_w$ and $k_h$ are the width and the height of the filter. Therefore, the weights in a convolutional layer is composed of $nk_w k_h$ vectors of length m. These vectors may have redundant information. To avoid this redundancy, LCNN uses a relatively small set of vectors for a layer that are referred to as a dictionary. An LCNN may enforce each vector in a weight filter of its layer to be a linear combination of a few elements (e.g., 2, 3, 4, or 5 elements) from this set. FIG. 1 shows an overview of the LCNN model. The gray matrix at the left of the figure is the dictionary 110. The dashed lines illustrate lookup of a few vectors from the dictionary and linearly combining them to build up a weight filter W 140. Using this structure, a fast inference algorithm may be implemented for LCNNs. The dictionaries may provide a strong prior on visual data and enable learning from few examples. In some implementations, dictionaries can be transferred across different network architectures, which may enable speed-up the training of a deep network by transferring the dictionaries from a shallower model.

In the process 100, a weight filter vector 142 in the weight filter W 140 is formed by a linear combination of few vectors (112, 114, and 116), which are looked up from the dictionary 110. Lookup indices and their coefficients are stored in a lookup index tensor I 120 and a lookup coefficient tensor C 130.

A convolutional layer in a CNN consists of four parts: 1) the input tensor $X \in R^{m \times w \times h}$; where m, w and h are the number of input channels, the width and the height, respectively, 2) a set of n weight filters, where each filter is a tensor $W \in R^{m \times k_w \times k_h}$, where $k_w$ and $k_h$ are the width and the height of the filter, 3) a scalar bias term $b \in R$ for each filter, and 4) the output tensor $Y \in R^{n \times w' \times h'}$, where each channel $Y_{[i,:,:]} \in R^{w' \times h'}$ is computed by W*X+b. Here * denotes a discrete convolution operation and the (:) notation is borrowed from NumPy for selecting all entries in a dimension.

For each layer, a matrix $D \in R^{k \times m}$ may be defined as the shared dictionary of vectors. This is illustrated in FIG. 1 as the dictionary 110 on the left side. This matrix contains k row vectors of length m. The size of the dictionary, k, might vary for different layers of the network, but it should always be smaller than $nk_w k_h$, the total number of vectors in all weight filters of a layer. Along with the dictionary D, there is a tensor for lookup indices $I \in N^{s \times k_w \times k_h}$, and a tensor for lookup coefficients $C \in R^{s \times k_w \times k_h}$ for each layer. For a pair (r, c), I[:,r,c] is a vector of length s whose entries are indices of the rows of the dictionary, which form the linear components of $W_{[:,r,c]}$. The entries of the vector $C_{[:,r,c]}$ specify the linear coefficients with which the components should be combined to make (e.g., the weight filter vector 142 in FIG. 1). For example, the parameter s, the number of components in a weight filter vector, may be a small number (e.g., 3, 5, or 10). The weight tensor can be constructed as follows:

$$W_{[:,r,c]} = \sum_{t=1}^{s} C_{[t,r,c]} \cdot D_{[I_{[t,r,c]},:]} \quad \forall r, c \tag{1}$$

This procedure is illustrated by the process 100 in FIG. 1. In LCNN, instead of storing the weight tensors W for convolutional layers, a dictionary D, lookup index tensors I and lookup coefficient tensors C, the building blocks of the weight tensors. As a result, the number of parameters in a convolutional layer may be reduced by reducing k, the dictionary size, and s, the number of components in the linear combinations.

The LCNN representation of the weights may be used to speedup inference by implementing fast convolution using a shared dictionary. A forward pass in a convolutional layer consists of n convolutions between the input tensor X and each of the weight filters W. A convolution between an $m \times k_w \times k_h$ weight filter and the input tensor X can be written as a sum of $k_w k_h$ separate (1×1)-convolutions:

$$X * W = \sum_{r,c}^{k_h, k_w} \text{shift}_{r,c}(X * W_{[:,r,c]}), \tag{2}$$

where $\text{shift}_{r,c}$ is the matrix shift function along rows and columns with zero padding relative to the filter size. Now the LCNN representation of weights (Equation 1) can be used to rewrite each 1×1 convolution:

$$X * W = \sum_{r,c} \text{shift}_{r,c}\left(X * \left(\sum_{t=1}^{s} C_{[t,r,c]} \cdot D_{[I_{[t,r,c]},:]}\right)\right) \tag{3}$$

$$= \sum_{r,c} \text{shift}_{r,c}\left(\sum_{t=1}^{s} C_{[t,r,c]}(X * D_{[I_{[t,r,c]},:]})\right)$$

Equation 3 suggests that instead of reconstructing the weight tensor W and convolving with the input, the input may be convolved with all of the dictionary vectors, and then compute the output according to I and C. Since the dictionary D is shared among all weight filters in a layer, the convolution between the input tensor X and all the dictionary vectors may be pre-computed. Let $S \in R^{k \times w \times h}$ be the output of convoling the input X with all of the dictionary vectors D, i.e., $$S_{[i,:,:]} = X * D_{[i,:]} \quad \forall 1 \le i \le k \quad (4)$$

Once the values of S are determined, the output of convolution may be reconstructed by lookups over the entries (e.g., the channels) of S according to I, then scale them by the values in C:

$$X * W = \sum_{r,c}^{k_h, k_w} \text{shift}_{r,c} \left( \sum_{t=1}^{s} C_{[t,r,c]} S_{[I_{[t,r,c]},:,:]} \right) \quad (5)$$

Figure 2:
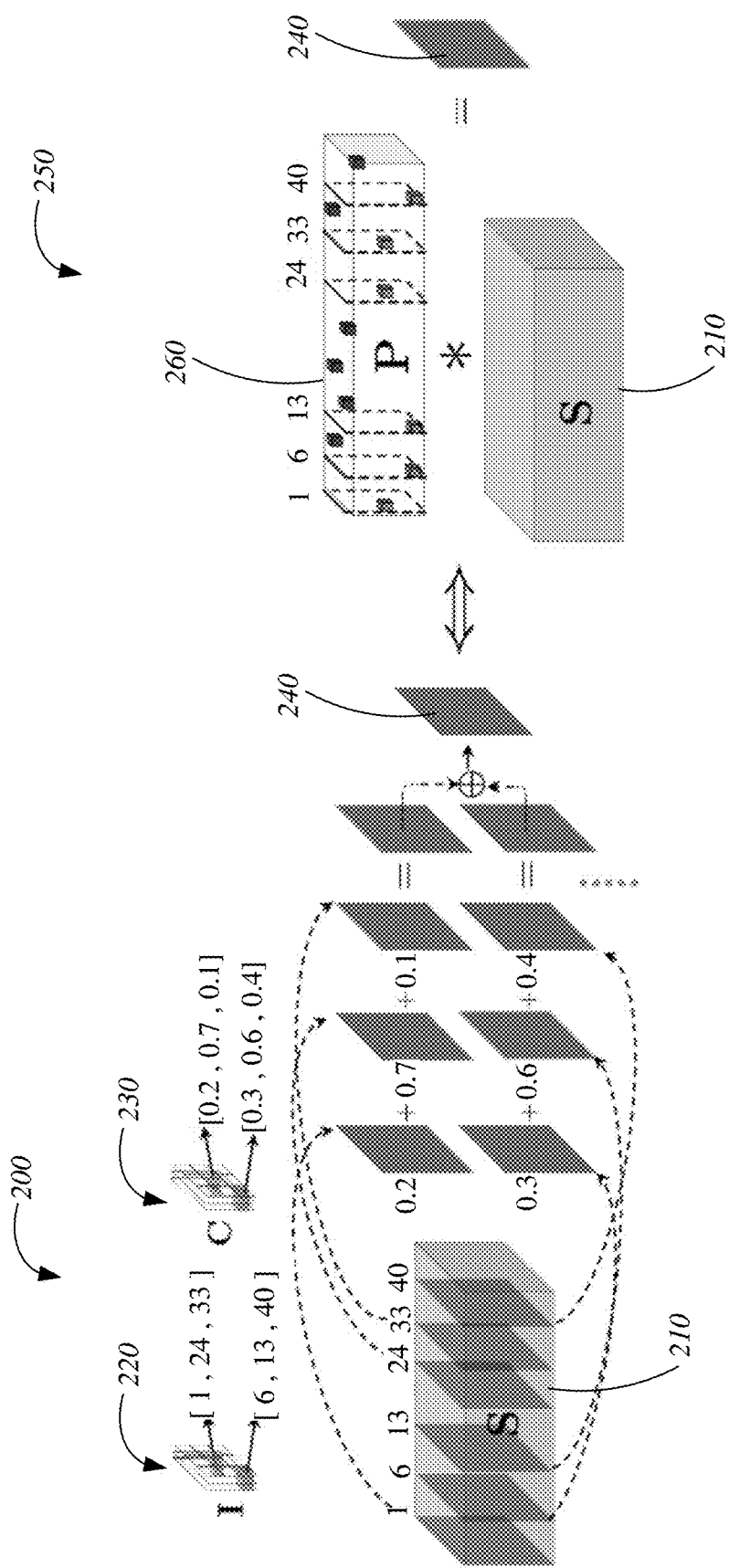
FIG. 2 is a diagram illustrating example processes for computing convolutions in a lookup-based convolutional neural network.

FIG. 2 is a diagram illustrating example processes (200 and 250) for computing convolutions in a lookup-based convolutional neural network. The input dictionary S 210 is the output of convolving a dictionary (e.g., the dictionary 110) with an input tensor X. The left side of FIG. 2 illustrates an inference time forward pass process 200 for implementing a convolution with a layer of an LCNN. The convolution between the input X and a weight filter W (e.g., the weight filter W 140) is carried out by lookups over the entries (e.g., channels) of the input dictionary S 210 and a few linear combinations to determine a result 240. Direct learning of a lookup index tensor I 220 and a lookup coefficient tensor C 230 may reduce to an intractable discrete optimization. The right side of FIG. 2 shows an equivalent process 250 for implementing the same convolution for training based on sparse convolutions. The sparse tensor P 260 is an alternative representation of the lookup index tensor I 220 and the lookup coefficient tensor C 230 that may be trained using stochastic gradient descent (SGD). The tiny cubes in the sparse tensor P 260 denote the non-zero entries. The sparse tensor P 260 may be convolved with the input dictionary S 210 to determine the result 240.

The process 200, on the left side of FIG. 2, implements a convolution according to Equation 5. Reducing the size of the dictionary k lowers the cost of computing the input dictionary S 210 and makes the forward pass faster. For example, since the input dictionary S 210 is computed by a dense matrix multiplication, OpenBlas may be used for fast matrix multiplication. In addition, by pushing the value of s to be small, the number of lookups and floating point operations may be reduced.

A LCNN represents a weight filter by linear combinations of a subset of elements in a shared dictionary. A LCNN may perform convolutions efficiently in two stages: 1—Small convolutions: convolving the input with a set of 1×1 filters (Equation 4). 2—Lookup and scale: few lookups over the channels of a tensor (e.g., the input dictionary S 210) followed by a linear combination (Equation 5). In some implementations, the dictionary and the lookup parameters, I and C may be jointly trained. Direct training of the proposed lookup-based convolution may lead to a combinatorial optimization problem to find values for the integer tensor I. To get around this, the lookup parameter tensors and scale stage (Equation 5) may be reformulated using a standard convolution with sparsity constraints.

Let $T \in \mathbb{R}^{k \times k_w \times k_h}$ be a one hot tensor, where $T_{[t,r,c]} = 1$ and all other entries are zero. Convolving the tensor S with T will result in $\text{shift}_{r,c}(S[t,:,:])$. This observation may be used to convert the lookup and scale stage (Equation 5) to a standard convolution. Lookups and scales may be expressed by a convolution between the tensor S and a sparse tensor P, where $P \in \mathbb{R}^{k \times w \times h}$, and $P_{[:,r,c]}$ is a s-sparse vector (i.e., it has only s non-zero entries) for all spatial positions (r, c). Positions of the non-zero entries in P are determined by the lookup index tensor I and their values are determined by the lookup coefficient tensor C. Formally, sparse tensor P may be expressed by I and C:

$$P_{j,r,c} = \begin{cases} C_{t,r,c}, & \exists t : I_{t,r,c} = j \\ 0, & \text{otherwise} \end{cases} \quad (6)$$

Note that this conversion is reversible, i.e., I and C may be determined from the position and the values of the non-zero entries in the sparse matrix P. With this conversion, the lookup and scale stage (Equation 5) becomes:

$$\sum_{r,c} \text{shift}_{(r,c)} \left( \sum_{t=1}^{s} C_{[t,r,c]} S_{[I_{[t,r,c]},:,:]} \right) = S * P \quad (7)$$

This equivalence is illustrated in FIG. 2 by the process 200 on the left and the equivalent process 250 on the right side of FIG. 2. Using the process 250, instead of directly training I and C, the sparse tensor P 260 may be trained with $\ell_0$-norm constraints ($\|P_{[:,r,c]}\|_{\ell_0} = s$) and then I and C may be constructed from P. However, $\ell_0$-norm is a non-continuous function with zero gradients everywhere. As a workaround, the constraint may be relaxed to an $\ell_1$-norm. At each iteration of training, to enforce the sparsity constraint for $P_{[:,r,c]}$, all the entries may be sorted by their absolute values and the top s entries may be kept while zeroing out the rest. During training, in addition to the classification loss L we also minimize $$\sum_{[r,c]} \|P_{[:,r,c]}\|_{\ell_1} = \|P\|_{\ell_1},$$

by adding a term $\lambda \|P\|\ell_1$ to the loss function. The gradient with respect to the values in P may be computed by:

$$\frac{\partial (L + \lambda \|P\|_{\ell_1})}{\partial P} = \frac{\partial L}{\partial P} + \lambda \text{sign}(P) \quad (8)$$

where $$\frac{\partial L}{\partial P}$$

is a gradient that is computed through a standard back-propagation. $\lambda$ is a hyperparameter that may be used to adjust a trade-off between the CNN loss function and the $\ell_1$ regularizer. In some implementations, the sparsity factor, s, may be allowed to be different at each spatial position (r; c), and be determined automatically at training time. This can be achieved by applying a threshold function, $$\delta(x) = \begin{cases} x, & |x| > \epsilon \\ 0, & \text{otherwise} \end{cases} \quad (9)$$

over the values in P during training. In some implementations, an LCNN back-propagates through this threshold function to compute the gradients with respect to P. The derivative of the threshold function is 1 everywhere except at $|x|<\varepsilon$, which is 0. Hence, if any of the entries of P becomes 0 at some iteration, they stay 0 forever. For example, using the threshold function, each vector may be allowed to be a combination of arbitrary vectors. At the end of the training, the sparsity parameter s at each spatial position (r, c) may be determined by the number of non-zero values in $P_{[:,r,c]}$.

Although the focus of LCNN is to speedup convolutional layers where most of the computations are, the lookup-based convolution model can also be applied on fully connected (FC) layers of a neural network. An FC layer that goes from m inputs to n outputs can be viewed as a convolutional layer with input tensor m×1×1 and n weight filters, each of size m×1×1. The same approach may be used to speedup fully connected layers.

After training, the sparse tensor P 260 may be converted to the lookup index tensor I 220 and the lookup coefficient tensor C 230 for a layer. At inference/test time, Equation 5 is implemented to efficiently compute the output of the layer.

The shared dictionary (e.g., the dictionary 110) in LCNN may enable a neural network to learn from very few training examples on novel categories, which is known as few-shot learning. A good model for few-shot learning may have two properties: a) strong priors on the data, and b) few trainable parameters. LCNN may have both of these properties. For example, an LCNN trained on a large dataset of images (e.g., ImageNet) may have a rich dictionary D at each convolutional layer. This dictionary may provide a powerful prior on visual data. At the time of fine-tuning for a new set of categories with few training examples, only updating the coefficients in C may be sufficient. This may reduce the number of trainable parameters significantly.

In a standard CNN, to use a pre-trained network to classify a set of novel categories, the classification layer is reinitialized randomly. This introduces a large number of parameters, on which there is no prior, and they should be trained solely by a few examples. LCNN, in contrast, can use the dictionary of the classification layer of the pre-trained model, and therefore it may be sufficient to learn I and C from scratch, which form a much smaller set of parameters. Furthermore, for all other layers, the few-shot training may only fine-tune the coefficients C, i.e., only update the non-zero entries of P. Note that the dictionary D may be fixed across all layers during the training with few examples.

Training very deep neural networks may be computationally expensive and may require hundreds of thousands of iterations. This is mainly due to the complexity of these models. In order to constrain the complexity, the number of learnable parameters in the network may be limited. LCNN has a suitable setting that allows limiting the number of learnable parameters without changing the architecture. For example, this can be done by transferring the shared dictionaries D from a shallower network to a deeper one.

Not only can a dictionary D be shared across layers, but the dictionary D can also shared across different network architectures of different depths. A dictionary $D \in R^{k \times m}$ can be used in any convolutional layer with input channel size m in any CNN architecture. For example, dictionaries may be trained on a shallow CNN and reuse in a deeper CNN with the same channel size. On the deeper CNN it may be sufficient to train a lookup index tensor I and a lookup coefficient tensor C, while holding the pre-trained dictionary D fixed.

Figure 3:
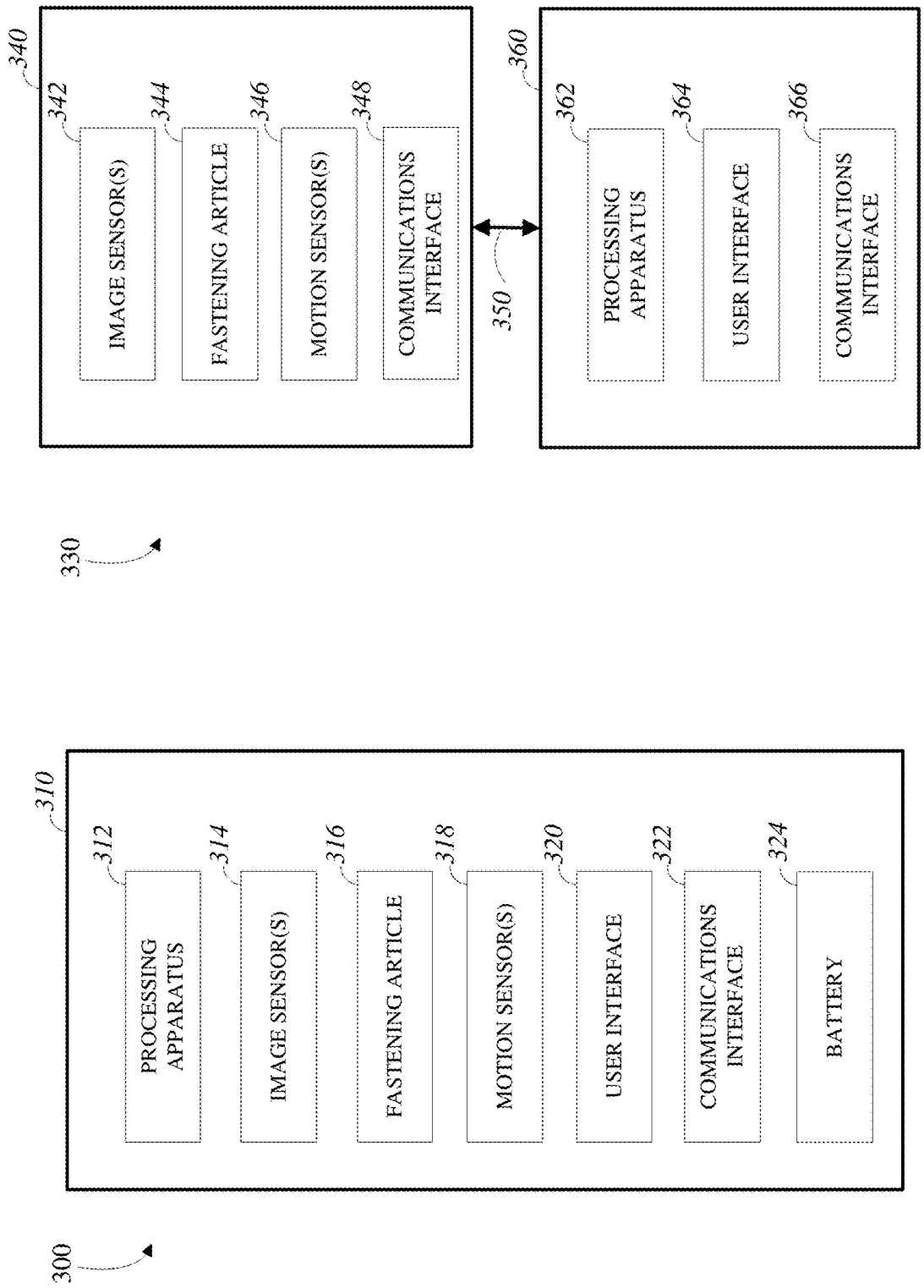
FIG. 3A is a block diagram of an example of a system configured for image capture with classification using a lookup-based convolutional neural network.
FIG. 3B is a block diagram of an example of a system configured for image capture with classification using a lookup-based convolutional neural network.

FIG. 3A is a block diagram of an example of a system 300 configured for image capture with classification using a lookup-based convolutional neural network. The system 300 includes an image capture device 310 (e.g., a camera or a head-mounted display for augmented reality applications) that includes a processing apparatus 312 that is configured to receive images from one or more image sensors 314. The image capture device 310 includes a fastening article 316 attached to the one or more image sensors 314 and configured to mount the one or more image sensors 314 in proximity to a portion (e.g., a head, a chest, or an arm) of a human body. The processing apparatus 312 may include a lookup-based convolutional neural network (e.g., implemented as a software module or a specialized hardware module). The processing apparatus 312 may be configured to apply the convolutional neural network to an image from the one or more image sensors 314 to obtain output (e.g., classification data and/or a filtered image). The image capture device 310 includes one or more motion sensors 318 configured to detect motion of the one or more image sensors 314. The image capture device 310 includes a user interface 320, which may allow a user to control image capture functions and/or view images. The image capture device 310 includes a communications interface 322 for transferring images to other devices. The image capture device 310 includes a battery 324 for powering the image capture device 310. For example, the system 300 may be used to implement processes described in this disclosure, such as the process 400 of FIG. 4, the process 500 of FIG. 5, the process 600 of FIG. 6, the process 700 of FIG. 7, and the process 800 of FIG. 8.

The processing apparatus 312 may include one or more processors having single or multiple processing cores. The processing apparatus 312 may include memory, such as a random-access memory (RAM) device, flash memory, or any other suitable type of storage device, such as a non-transitory computer readable memory. The memory of the processing apparatus 312 may include executable instructions and data that can be accessed by one or more processors of the processing apparatus 312. For example, the processing apparatus 312 may include one or more DRAM modules, such as double data rate synchronous dynamic random-access memory (DDR SDRAM). In some implementations, the processing apparatus 312 may include a graphical processing unit (GPU). In some implementations, the processing apparatus 312 may include a digital signal processor (DSP). In some implementations, the processing apparatus 312 may include an application specific integrated circuit (ASIC). For example, the processing apparatus 312 may include a custom image signal processor. In some implementations, the processing apparatus 312 may have multiple processing units in different portions of the image capture device 310.

The processing apparatus 312 may include a lookup-based convolutional neural network, which may be configured to detect and/or classify objects appearing in images from the one or more image sensors 314. For example, the convolutional neural network may be implemented by software executed by the processing apparatus 312. The processing apparatus 312 may be configured to access an image captured using the image sensor; apply a convolutional neural network to image data based on the image to obtain an output, in which a layer of the convolutional network includes filters with weights that are stored as a dictionary D of channel weight vectors, a respective lookup index tensor I that indexes the dictionary, and a respective lookup coefficient tensor C, and in which applying the convolutional neural network includes convolving the channel weight vectors of the dictionary D with an input tensor based on the image to obtain an input dictionary S, and combining entries of the input dictionary S that are indexed with indices from the respective lookup index tensor I and multiplied with corresponding coefficients from the respective lookup coefficient tensor C; and store, display, or transmit data based on the output of the convolutional neural network. For example, the processing apparatus 312 may be configured to train the convolutional neural network by back-propagation using a sparse tensor P, wherein non-zero entries of the sparse tensor P correspond to coefficients of the respective lookup coefficient tensor C at locations corresponding to indices of the respective lookup index tensor I, and in which performing a training iteration includes convolving the channel weight vectors of the dictionary D with a training input tensor based on a training image to obtain a training input dictionary S; convolving the training input dictionary S with the sparse tensor P to obtain training activations; determining a loss function based on the training activations; and updating the sparse tensor P based on the loss function. In some implementations, the loss function includes a regularization term based on a norm of the sparse tensor P. In some implementations, the training iteration includes sorting entries of a vector of the sparse tensor P corresponding to a spatial location, and zeroing out all but the s largest entries of the vector of the sparse tensor P, wherein s is a sparsity constraint. In some implementations, the training iteration includes applying a threshold function to entries of the sparse tensor P. In some implementations, the training iteration includes back-propagating through a threshold function to determine a gradient with respect to the sparse tensor P. For example, the processing apparatus 312 may be configured to train the convolutional neural network using back-propagation to update the respective lookup index tensor I and the respective lookup coefficient tensor C in multiple training iterations, while holding the dictionary D of channel weight vectors fixed. In some implementations, the dictionary D of channel weight vectors is used in multiple layers of the convolutional neural network. For example, the dictionary D of channel weight vectors may have been determined by training a different neural network that includes the dictionary D. The different neural network may be a different depth than the convolutional neural network. For example, the processing apparatus 312 may be configured to determine the dictionary D of channel weight vectors by training a different neural network that includes the dictionary D. For example, the different neural network has less layers than the convolutional neural network. In some implementations, the output is a classification of the image. For example, the convolutional neural network may be trained by implementing the process 600 of FIG. 6.

The one or more image sensors 314 are configured to capture images. The one or more image sensors 314 are configured to detect light of a certain spectrum (e.g., the visible spectrum or the infrared spectrum) and convey information constituting an image as electrical signals (e.g., analog or digital signals). For example, the one or more image sensors 314 may include charge-coupled devices (CCD) or active pixel sensors in complementary metal-oxide-semiconductors (CMOS). The one or more image sensors 314 may detect light incident through respective lens (e.g., a fisheye lens). In some implementations, the one or more image sensors 314 include digital-to-analog converters. In some implementations, the one or more image sensors 314 have respective fields of view that overlap. The one or more image sensors 314 are attached to the processing apparatus 312 as components of the image capture device 310.

The fastening article 316 is attached to the one or more image sensors 314 and configured to mount the one or more image sensors 314 in proximity to a portion of a human body. For example, the fastening article 316 may include glasses or goggles that, when worn by a human, fasten the one or more image sensors 314 in proximity to a head of the human. For example, the fastening article 316 may include a wristband that, when worn by a human, fastens the one or more image sensors 314 in proximity to an arm of the human. For example, the fastening article 316 may include a shirt or vest that, when worn by a human, fastens the one or more image sensors 314 in proximity to a chest of the human. For example, the fastening article 316 may include a band or strap of a headset configured for augmented reality applications and/or virtual reality applications that, when worn by a human, fastens the one or more image sensors 314 in proximity to a head of the human.

The one or more motion sensors 318 are configured to detect motion of the one or more image sensors 314. For example, the one or more motion sensors 318 may include parts of an inertial measurement unit (e.g., including gyroscopes, accelerometers, and/or magnetometers) that is installed in a housing with the one or more image sensors 314. The processing apparatus 312 may be configured to determine a sequence of orientation estimates based on sensor data from the one or more motion sensors 318. For example, determining the sequence of orientation estimates may include applying quadratic estimation to sensor data from a plurality of the one or more motion sensors 318.

The image capture device 310 may include a user interface 320. For example, the user interface 320 may include an LCD display for presenting images and/or messages to a user. For example, the user interface 320 may include goggles or a headset with a display configured to support augmented reality applications, and the user interface 320 may be configured to incorporate metadata based on localization data and/or classification data from the convolutional neural network into images displayed through the user interface 320. For example, the user interface 320 may include a button or switch enabling a person to manually turn the image capture device 310 on and off. For example, the user interface 320 may include a shutter button for snapping pictures.

The image capture device 310 may include a communications interface 322, which may enable communications with a personal computing device (e.g., a smartphone, a tablet, a laptop computer, or a desktop computer). For example, the communications interface 322 may be used to receive commands controlling image capture and processing in the image capture device 310. For example, the communications interface 322 may be used to transfer image data to a personal computing device. For example, the communications interface 322 may include a wired interface, such as a high-definition multimedia interface (HDMI), a universal serial bus (USB) interface, or a FireWire interface. For example, the communications interface 322 may include a wireless interface, such as a Bluetooth interface, a ZigBee interface, and/or a Wi-Fi interface.

The image capture device 310 may include a battery 324 that powers the image capture device 310 and/or its peripherals. For example, the battery 324 may be charged wirelessly or through a micro-USB interface.

FIG. 3B is a block diagram of an example of a system 330 configured for image capture with classification using a lookup-based convolutional neural network. The system 330 includes an image capture device 340 and a personal computing device 360 that communicate via a communications link 350. The image capture device 340 includes one or more image sensors 342 that are configured to capture images. The image capture device 340 includes a communications interface 348 configured to transfer images via the communication link 350 to the personal computing device 360. The personal computing device 360 includes a processing apparatus 362 that is configured to receive, using the communications interface 366, images from the one or more image sensors 342. The image capture device 340 includes a fastening article 344 attached to the one or more image sensors 342 and configured to mount the one or more image sensors 342 in proximity to a portion (e.g., a head, a chest, or an arm) of a human body. The processing apparatus 362 may include a lookup-based convolutional neural network (e.g., implemented as a software module or a specialized hardware module). The processing apparatus 362 may be configured to apply the lookup-based convolutional neural network to an image from the one or more image sensors 342 to obtain output (e.g., classification data and/or a filtered image). The image capture device 340 includes one or more motion sensors 346 configured to detect motion of the one or more image sensors 342. For example, the system 330 may be used to implement processes described in this disclosure, such as the process 400 of FIG. 4, the process 500 of FIG. 5, the process 600 of FIG. 6, the process 700 of FIG. 7, and the process 800 of FIG. 8.

The one or more image sensors 342 are configured to capture images. The one or more image sensors 342 are configured to detect light of a certain spectrum (e.g., the visible spectrum or the infrared spectrum) and convey information constituting an image as electrical signals (e.g., analog or digital signals). For example, the one or more image sensors 342 may include charge-coupled devices (CCD) or active pixel sensors in complementary metal-oxide-semiconductors (CMOS). The one or more image sensors 342 may detect light incident through respective lenses (e.g., a fisheye lens). In some implementations, the one or more image sensors 342 include digital-to-analog converters. In some implementations, the one or more image sensors 342 have respective fields of view that overlap.

The fastening article 344 is attached to the one or more image sensors 342 and configured to mount the one or more image sensors 342 in proximity to a portion of a human body. For example, the fastening article 344 may include glasses or goggles that, when worn by a human, fasten the one or more image sensors 342 in proximity to a head of the human. For example, the fastening article 344 may include a wristband that, when worn by a human, fastens the one or more image sensors 342 in proximity to an arm of the human. For example, the fastening article 344 may include a shirt or vest that, when worn by a human, fastens the one or more image sensors 342 in proximity to a chest of the human. For example, the fastening article 344 may include a band or strap of a headset configured for augmented reality applications and/or virtual reality applications that, when worn by a human, fastens the one or more image sensors 342 in proximity to a head of the human.

The one or more motion sensors 346 are configured to detect motion of the one or more image sensors 342. For example, the one or more motion sensors 346 may include parts of an inertial measurement unit (e.g., including gyroscopes, accelerometers, and/or magnetometers) that is installed in a housing with the one or more image sensors 342. The processing apparatus 362 may be configured to determine a sequence of orientation estimates based on sensor data from the one or more motion sensors 346. For example, determining the sequence of orientation estimates may include applying quadratic estimation to sensor data from a plurality of the one or more motion sensors 346.

The communications link 350 may be a wired communications link or a wireless communications link. The communications interface 348 and the communications interface 366 may enable communications over the communications link 350. For example, the communications interface 348 and the communications interface 366 may include a high-definition multimedia interface (HDMI), a universal serial bus (USB) interface, a FireWire interface, a Bluetooth interface, a ZigBee interface, and/or a Wi-Fi interface. For example, the communications interface 348 and the communications interface 366 may be used to transfer image data from the image capture device 340 to the personal computing device 360 for image signal processing (e.g., object detection, object classification, filtering, tone mapping, stitching, encoding) to generate output images and/or metadata based on image data from the one or more image sensors 342. For example, the communications interface 348 and the communications interface 366 may be used to transfer motion sensor data from the image capture device 340 to the personal computing device 360. For example, the communications interface 348 and the communications interface 366 may be used to transfer control signals to the image capture device 340 from the personal computing device 360 for controlling capture of images.

The processing apparatus 362 may include one or more processors having single or multiple processing cores. The processing apparatus 362 may include memory, such as a random-access memory (RAM) device, flash memory, or any other suitable type of storage device, such as a non-transitory computer readable memory. The memory of the processing apparatus 362 may include executable instructions and data that can be accessed by one or more processors of the processing apparatus 362. For example, the processing apparatus 362 may include one or more DRAM modules, such as double data rate synchronous dynamic random-access memory (DDR SDRAM). In some implementations, the processing apparatus 312 may include a graphical processing unit (GPU). In some implementations, the processing apparatus 362 may include a digital signal processor (DSP). In some implementations, the processing apparatus 362 may include an application specific integrated circuit (ASIC). For example, the processing apparatus 362 may include a custom image signal processor.

The processing apparatus 362 may include a lookup-based convolutional neural network, which may be configured to detect and/or classify objects appearing in images from the one or more image sensors 342. For example, the convolutional neural network may be implemented by software executed by the processing apparatus 362. The processing apparatus 362 may be configured to access an image captured using the image sensor; apply a convolutional neural network to image data based on the image to obtain an output, in which a layer of the convolutional network includes filters with weights that are stored as a dictionary D of channel weight vectors, a respective lookup index tensor I that indexes the dictionary, and a respective lookup coefficient tensor C, and in which applying the convolutional neural network includes convolving the channel weight vectors of the dictionary D with an input tensor based on the image to obtain an input dictionary S, and combining entries of the input dictionary S that are indexed with indices from the respective lookup index tensor I and multiplied with corresponding coefficients from the respective lookup coefficient tensor C; and store, display, or transmit data based on the output of the convolutional neural network. For example, the processing apparatus 362 may be configured to train the convolutional neural network by back-propagation using a sparse tensor P, wherein non-zero entries of the sparse tensor P correspond to coefficients of the respective lookup coefficient tensor C at locations corresponding to indices of the respective lookup index tensor I, and in which performing a training iteration includes convolving the channel weight vectors of the dictionary D with a training input tensor based on a training image to obtain a training input dictionary S; convolving the training input dictionary S with the sparse tensor P to obtain training activations; determining a loss function based on the training activations; and updating the sparse tensor P based on the loss function. In some implementations, the loss function includes a regularization term based on a norm of the sparse tensor P. In some implementations, the training iteration includes sorting entries of a vector of the sparse tensor P corresponding to a spatial location, and zeroing out all but the s largest entries of the vector of the sparse tensor P, wherein s is a sparsity constraint. In some implementations, the training iteration includes applying a threshold function to entries of the sparse tensor P. In some implementations, the training iteration includes back-propagating through a threshold function to determine a gradient with respect to the sparse tensor P. For example, the processing apparatus 362 may be configured to train the convolutional neural network using back-propagation to update the respective lookup index tensor I and the respective lookup coefficient tensor C in multiple training iterations, while holding the dictionary D of channel weight vectors fixed. In some implementations, the dictionary D of channel weight vectors is used in multiple layers of the convolutional neural network. For example, the dictionary D of channel weight vectors may have been determined by training a different neural network that includes the dictionary D. The different neural network may be a different depth than the convolutional neural network. For example, the processing apparatus 362 may be configured to determine the dictionary D of channel weight vectors by training a different neural network that includes the dictionary D. For example, the different neural network has less layers than the convolutional neural network. In some implementations, the output is a classification of the image. For example, the convolutional neural network may be trained by implementing the process 600 of FIG. 6.

The personal computing device 360 may include a user interface 364. For example, the user interface 364 may include a touchscreen display for presenting images and/or messages to a user and receiving commands from a user. For example, the user interface 364 may include goggles or a headset with a display configured to support augmented reality applications, and the user interface 364 may be configured to incorporate metadata based on localization data and/or classification data from the convolutional neural network into images displayed through the user interface 364. For example, the user interface 364 may include a button or switch enabling a person to manually turn the personal computing device 360 on and off. In some implementations, commands (e.g., start recording video, stop recording video, snap photograph, or select tracking target) received via the user interface 364 may be passed on to the image capture device 340 via the communications link 350.

Figure 4:
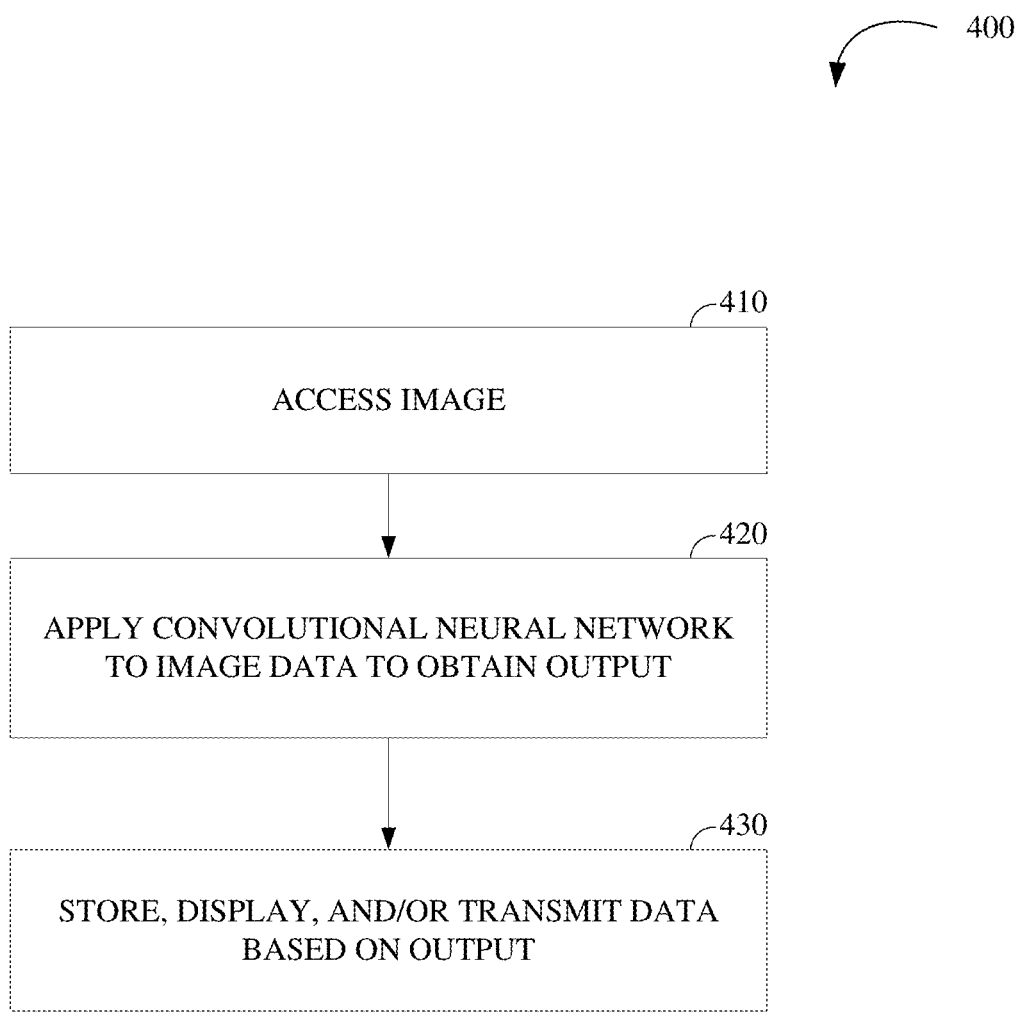
FIG. 4 is a flowchart of an example of a process for using a lookup-based convolutional neural network inference mode on an image.

FIG. 4 is a flowchart of an example of a process 400 for using a lookup-based convolutional neural network inference mode on an image. The process 400 includes accessing 410 an image; applying 420 a convolutional neural network to image data based on the image to obtain output; and storing, displaying, or transmitting 430 data based on the output. For example, the process 400 may be implemented by a wearable device (e.g., including an augmented reality visor). For example, the process 400 may be implemented by the system 300 of FIG. 3A or the system 330 of FIG. 3B. For example, the process 400 may be implemented by an image capture device, such as the image capture device 310 shown in FIG. 3A. For example, the process 400 may be implemented by a personal computing device, such as the personal computing device 360.

The process 400 includes accessing 410 an image captured using an image sensor. The image sensor may be part of an image capture system (e.g., the image capture device 310, or the image capture device 340). In some implementations, the image sensor may be attached to a processing apparatus that implements the process 400. For example, the image may be accessed 410 by receiving the image from the image sensor via a bus. In some implementations, the image may be accessed 410 via a communications link (e.g., the communications link 350). For example, the image may be accessed 410 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the image may be accessed 410 via the communications interface 366. For example, the image may be accessed 410 as an input image signal, which may represent each pixel value in a defined format, such as in a RAW image format or a YUV image format. In some implementations, the image may be a frame of a video (i.e., one of a sequence of images of a video). In some implementations, the image is accessed 410 directly from the image sensor without intermediate image processing. In some implementations, the image is accessed 410 after being subjected to intermediate image processing (e.g., spatial noise reduction and/or temporal noise reduction). In some implementations, the image is accessed 410 by retrieving the image from a memory or other data storage apparatus.

The process 400 includes applying 420 a convolutional neural network to image data based on the image to obtain an output. A layer of the convolutional network may include filters with weights that are stored as a dictionary D (e.g., the dictionary 110) of channel weight vectors, a respective lookup index tensor I (e.g., the lookup index tensor I 120) that indexes the dictionary, and a respective lookup coefficient tensor C (e.g., the lookup coefficient tensor C 130). For example, the image data may include the image stored as an input tensor X. For example, the output may include the output is a classification of the image. For example, applying 420 the convolutional neural network may include implementing an inference time forward pass process (e.g., the process 200) with a layer of the convolutional neural network. For example, applying 420 the convolutional neural network may include convolving the channel weight vectors of the dictionary D with an input tensor X based on the image to obtain an input dictionary S (e.g., the input dictionary S 210), and combining entries of the input dictionary S that are indexed with indices from the respective lookup index tensor I and multiplied with corresponding coefficients from the respective lookup coefficient tensor C. In some implementations, a layer using the dictionary D is a first, input layer of the convolutional neural network, and the input tensor X may include input image data (e.g., RAW image data). In some implementations, a layer using the dictionary D is a second or deeper layer of the convolutional neural network, and the input tensor X may include activations or output from prior layers of the convolutional neural network that are based on the image. In some implementations, a layer using the dictionary D is a last or output layer of the convolutional neural network, and the output is a set of convolution results or activations from the layer (e.g., the output is a tensor Y=W*X+b). In some implementations, a layer using the dictionary D is a hidden layer of the convolutional neural network, and the output is a set of convolution results or activations from a subsequent layer (e.g., the output is a classification vector for the image or a portion of the image that results from processing of subsequent layers, which may include fully connected layers). In some implementations, only one layer of the convolutional neural network uses the dictionary D for inference time processing. In some implementations, multiple layers of the convolutional neural network uses the dictionary D for inference time processing. For example, a layer of the convolution neural network may implement a convolution operation in accordance with Equation 5. For example, applying 420 the convolutional neural network may include implementing the process 500 of FIG. 5.

The process 400 may include storing, displaying, or transmitting 430 data based on the output of the convolutional neural network. In some implementations, the data based on the output is an indication of one or more classes from a set of classes that are determined to best match the image or a portion of the image. In some implementations, the data based on the output is a filtered image based on the image and the output of the convolutional neural network. For example, the data based on the output may be transmitted 430 to an external device (e.g., a personal computing device) for display or storage. For example, the data based on the output may be stored 430 in memory of a processing apparatus (e.g., the processing apparatus 312 or the processing apparatus 362). For example, the data based on the output may be displayed 430 in the user interface 320 or in the user interface 364. For example, the data based on the output may be an image or text displayed 430 using a head-mounted display as part of an augmented reality application. For example, the data based on the output may be transmitted 430 via the communications interface 322.

Figure 5:
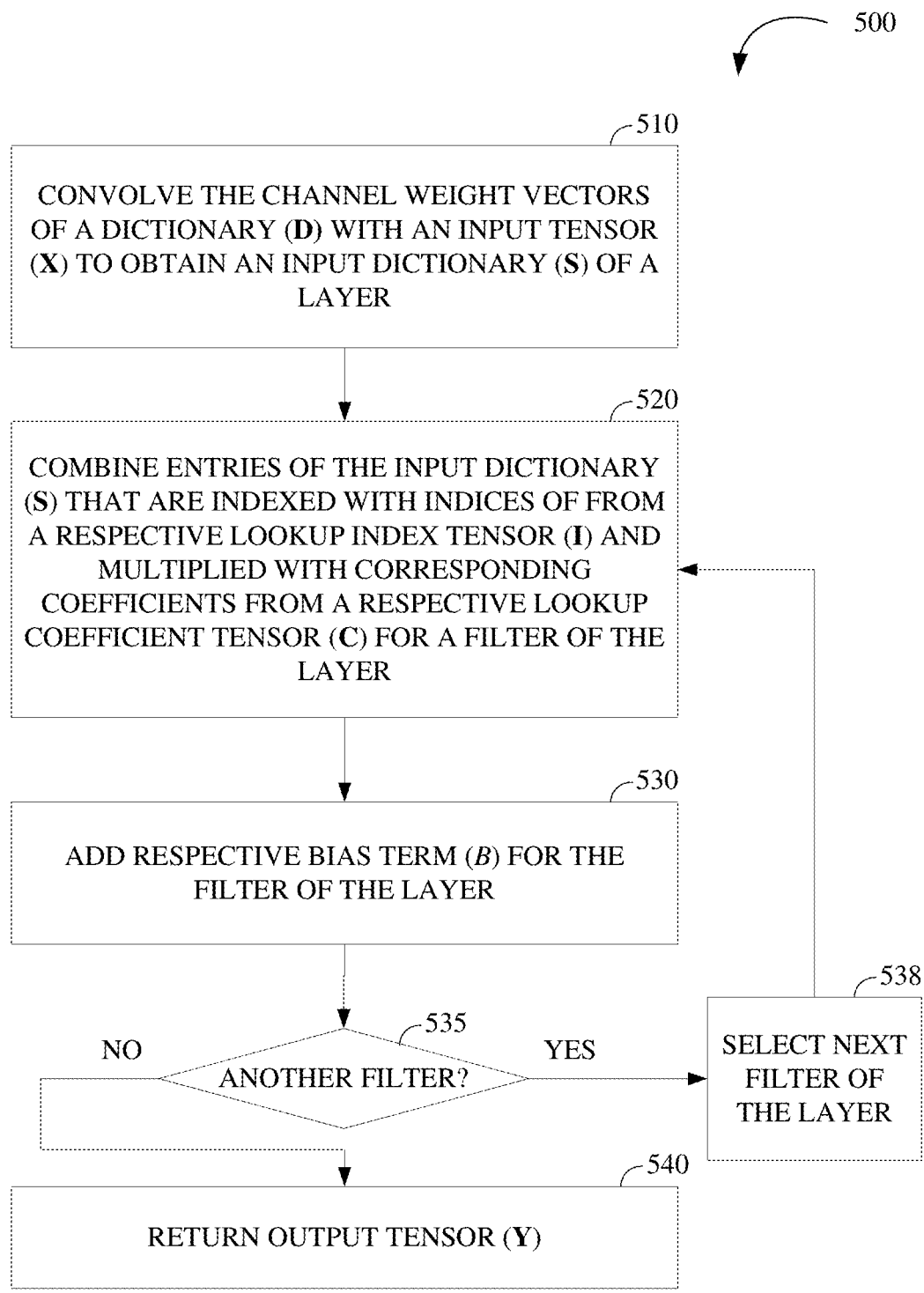
FIG. 5 is a flowchart of an example of a process for applying lookup-based layer of a convolutional neural network to image data.

FIG. 5 is a flowchart of an example of a process 500 for applying lookup-based layer of a convolutional neural network to image data. The process 500 includes convolving 510 the channel weight vectors of the dictionary D with an input tensor X based on the image to obtain an input dictionary S; combining 520 entries of the input dictionary S that are indexed with indices from the respective lookup index tensor I and multiplied with corresponding coefficients from the respective lookup coefficient tensor C; adding 530 a respective bias term b for a filter of the layer; and returning 540 an output tensor Y. The process 500 may be implemented by one or more layers of a convolutional neural network as part of inference time forward pass processing. For example, the process 500 may be implemented by a wearable device (e.g., including an augmented reality visor). For example, the process 500 may be implemented by the system 300 of FIG. 3A or the system 330 of FIG. 3B. For example, the process 500 may be implemented by an image capture device, such as the image capture device 310 shown in FIG. 3A. For example, the process 500 may be implemented by a personal computing device, such as the personal computing device 360.

The process 500 includes convolving 510 the channel weight vectors of the dictionary D (e.g., the dictionary 110) with an input tensor X based on the image to obtain an input dictionary S (e.g., the input dictionary S 210). For example, the input tensor X may be convolved 510 with the channel weight vectors of the dictionary D in accordance with Equation 4. For example, convolving 510 the channel weight vectors of the dictionary D with the input tensor X may be performed as (1×1)-convolutions. In some implementations, the dictionary D of channel weight vectors is used in multiple layers of the convolutional neural network.

The process 500 includes combining 520 entries (e.g., channels) of the input dictionary S that are indexed with indices from the respective lookup index tensor I (e.g., the lookup index tensor I 220) and multiplied with corresponding coefficients from the respective lookup coefficient tensor C (e.g., the lookup coefficient tensor C 230). For example, the entries of the input dictionary S may be linearly combined 520. For example, the entries of the input dictionary S may be combined 520 in accordance with Equation 5 to implement a convolution of the input tensor X with a corresponding weight filter W. Using lookups and reducing the number of floating point operations performed may reduce the computational complexity of the larger convolution operation on the computing platforms, which may be resource constrained.

The process 500 includes adding 530 a respective bias term b for a filter of the layer. For example, the respective bias term b for filter may be added 530 directly to the result (e.g., the result 240) of the convolution operation implemented using the dictionary D, a respective lookup index tensor I and a respective lookup coefficient tensor C.

If (at step 535) there are one or more filters to apply for the layer, then the next filter of the layer is selected 538, and a respective lookup index tensor I and a respective lookup coefficient tensor C for the next filter are accessed and used to combine 520 entries (e.g., channels) of the input dictionary S. The process 500 may continue to apply filters of the layer in this manner until (at step 535) all of the filters of the layer have been applied.

The process 500 includes, returning 540 an output tensor Y, which may include outputs of one or more filters W that are implemented by the dictionary D, a respective lookup index tensor I and a respective lookup coefficient tensor C. In some implementations, the output tensor Y may be returned 540 as the output of the convolutional neural network. In some implementations, the output tensor Y may be returned 540 as an intermediate result that is passed to one or more additional layers of the convolutional neural network for processing.

Figure 6:
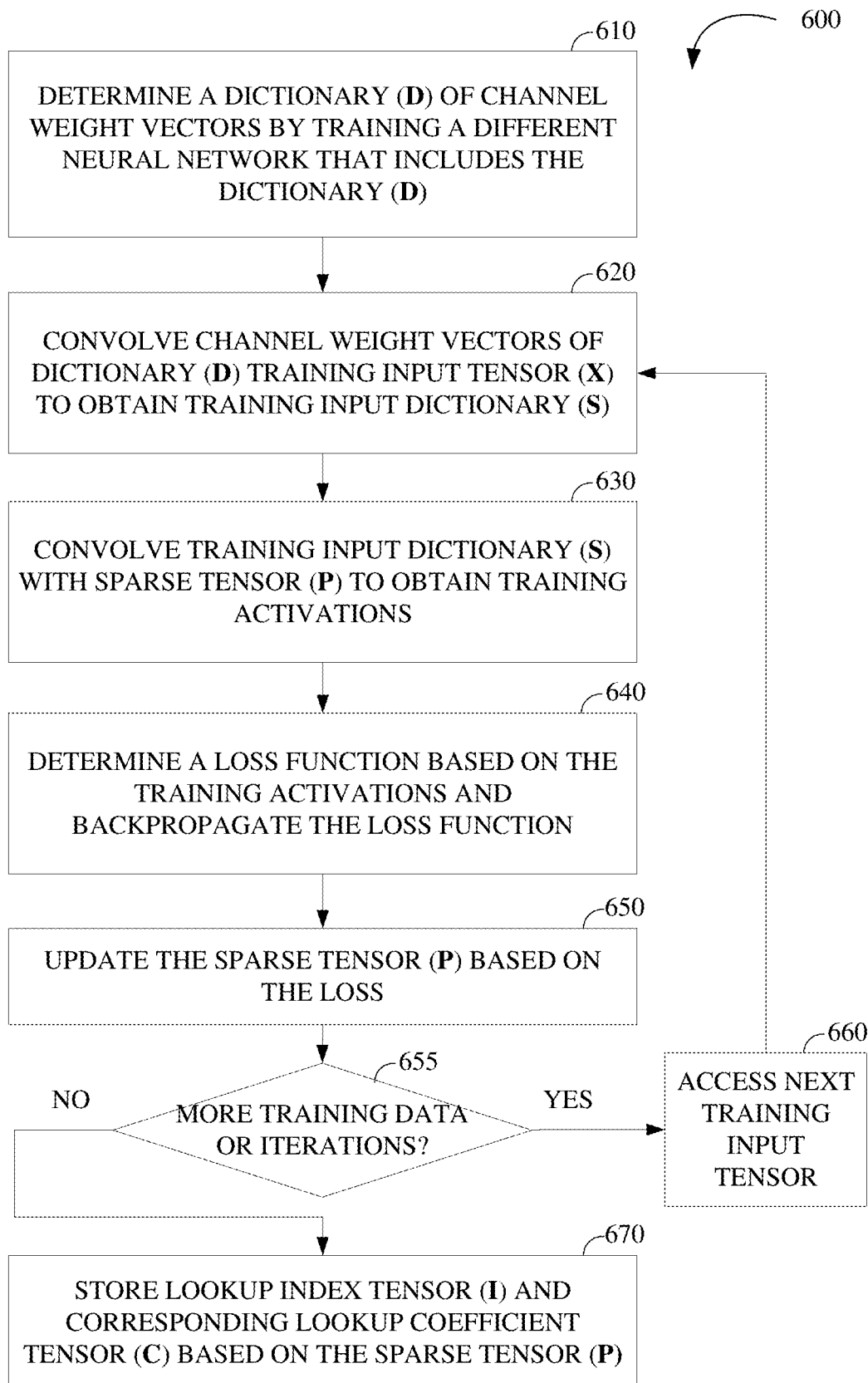
FIG. 6 is a flowchart of an example of a process for training a convolutional neural network to determine lookup-based parameters.

FIG. 6 is a flowchart of an example of a process 600 for training a convolutional neural network to determine lookup-based parameters. The process 600 may be used to train the convolutional neural network by back-propagation using a sparse tensor P (e.g., the sparse tensor P 260). Non-zero entries of the sparse tensor P may correspond to coefficients of a respective lookup coefficient tensor C (e.g., the lookup coefficient tensor C 230) at locations corresponding to indices of the respective lookup index tensor I (e.g., the lookup index tensor I 220). The process 600 includes determining 610 a dictionary D of channel weight vectors by training a different neural network that includes the dictionary D; convolving 620 the channel weight vectors of the dictionary D with a training input tensor X based on a training image to obtain a training input dictionary S; convolving 630 the training input dictionary S with the sparse tensor P to obtain training activations; determining 640 a loss function based on the training activations; updating 650 the sparse tensor P based on the loss function; and storing 670 the lookup index tensor I and the lookup coefficient tensor C that are based on the sparse tensor P. The process 600 may be implemented by one or more layers of a convolutional neural network as part of training. For example, the process 600 may be implemented by a wearable device (e.g., including an augmented reality visor). For example, the process 600 may be implemented by the system 300 of FIG. 3A or the system 330 of FIG. 3B. For example, the process 600 may be implemented by an image capture device, such as the image capture device 310 shown in FIG. 3A. For example, the process 600 may be implemented by a personal computing device, such as the personal computing device 360. For example, on-device, in-field training of the convolutional neural network on a resource constrained computing platform (e.g., a wearable device) and/or with few training examples may be enabled by using the process 600 to determine the lookup index tensor I and the lookup coefficient tensor C.

The process 600 includes determining 610 a dictionary D (e.g., the dictionary 110) of channel weight vectors by training a different neural network that includes the dictionary D. In some implementations, the dictionary D of channel weight vectors has been determined by training a different neural network that includes the dictionary D. The different neural network may be a different depth (e.g., having more layers or a less layers) than the convolutional neural network. For example, the different network may have less layers to reduce the complexity of the back-propagation training used to determine the dictionary D. The dictionary D may be determined in offline training on a processing apparatus that is different from a processing apparatus that will apply the convolutional network using the dictionary D at inference time, or the dictionary D may be determined in online, in-field training on a processing apparatus that will apply the convolutional network using the dictionary D at inference time. For example, a processing apparatus that applies the neural network for inference may be configured to determine the dictionary D of channel weight vectors by training a different neural network that includes the dictionary D. For example, the different neural network has less layers than the convolutional neural network. In some implementations (not shown in FIG. 6), the dictionary D may be determined by training (e.g., offline or online), with the same convolution neural network that will be used for inference. In some implementations, the dictionary D of channel weight vectors is used in multiple layers of the convolutional neural network.

The process 600 includes convolving 620 the channel weight vectors of the dictionary D with a training input tensor X based on a training image to obtain a training input dictionary S (e.g., the input dictionary S 210). For example, the training input tensor X may be convolved 620 with the channel weight vectors of the dictionary D in accordance with Equation 4. For example, convolving 620 the channel weight vectors of the dictionary D with the training input tensor X may be performed as (1×1)-convolutions.

The process 600 includes convolving 630 the training input dictionary S with the sparse tensor P to obtain training activations. For example, sparse tensor B may be convolved 630 with the training input dictionary S in accordance with Equation 7 (e.g., as illustrated by the process 250). The training activations may be outputs of the convolutional neural network. In some implementations, the training activations are intermediate results (e.g., the result 240) that are passed to subsequent layers of the convolutional neural network.

The process 600 includes determining 640 a loss function based on the training activations. For example, the output of the convolutional neural network may be a classification of the image, and the loss function may include a classification loss function. For example, the output of the convolutional neural network may be a filtered image, and the loss function may include an image distortion loss function. In some implementations, the loss function includes a regularization term based on a norm (e.g., an $\ell_1$-norm or an $\ell_2$-norm) of the sparse tensor P. For example, the loss function may be determined 640 in accordance with Equation b 8.

The process 600 includes updating 650 the sparse tensor P based on the loss function. For example, the sparse tensor P may be updated 650 using a gradient descent training algorithm based on a back-propagated loss function. In some implementations, sparsity of the sparse tensor P is enforced when the sparse tensor is updated 650 (e.g., by zeroing out the smallest entries in a vector of the sparse tensor P to meet the sparsity constraint). For example, the process 700 of FIG. 7 may be implemented to enforce a sparsity constraint on the sparse tensor P during training. In some implementations, a sparsity constraint is relaxed during training iterations and enforced at the end of a training process (e.g., when mapping to a corresponding lookup index tensor I and lookup coefficient tensors C). In some implementations, a sparsity constraint is not strictly enforced and the size of the corresponding lookup index tensor I and lookup coefficient tensor C may be determined dynamically based on the updates to the sparse tensor P that occur during training. For example, a training iteration may include applying a threshold function (e.g., the threshold function of Equation 9) to entries of the sparse tensor P (e.g., when updating 650 the sparse tensor P).For example, a training iteration may include back-propagating through a threshold function (e.g., the threshold function of Equation 9) to determine a gradient with respect to the sparse tensor P. For example, the sparse tensor P may be updated 650 based on the thresholded gradient.

If (at step 655) there are more training examples to processes and/or more training iterations to perform, then the next training example (e.g., a training input tensor) is accessed 660, and the training continues by convolving 620 the next training input tensor with the channel weight vectors of the dictionary D. The process 600 may continue to train in this manner until (at step 535) all of the training data have been processed and/or all of the training iterations have been completed.

The process 600 includes, storing 670 the lookup index tensor I and the lookup coefficient tensor C that are based on the sparse tensor P. For example, the lookup index tensor I and the lookup coefficient tensor C may be determined based on the updated 650 sparse tensor in accordance with Equation 6. For example, the lookup index tensor I and the lookup coefficient tensor C may be stored 670 for later use in the convolutional neural network during application at inference time (e.g., using the process 400 of FIG. 4 and/or the process 500 of FIG. 5). For example, the lookup index tensor I and the lookup coefficient tensor C may be stored 670 in memory of a processing apparatus (e.g., the processing apparatus 312 or the processing apparatus 362).

Although not explicitly shown in FIG. 6, it is noted that, for layers with multiple weight filters, the multiple filters and their respective sparse tensors P (corresponding to their respective lookup index tensors I and the lookup coefficient tensors C) may be updated 650 in parallel (at steps 630, 640, and 650).

Figure 7:
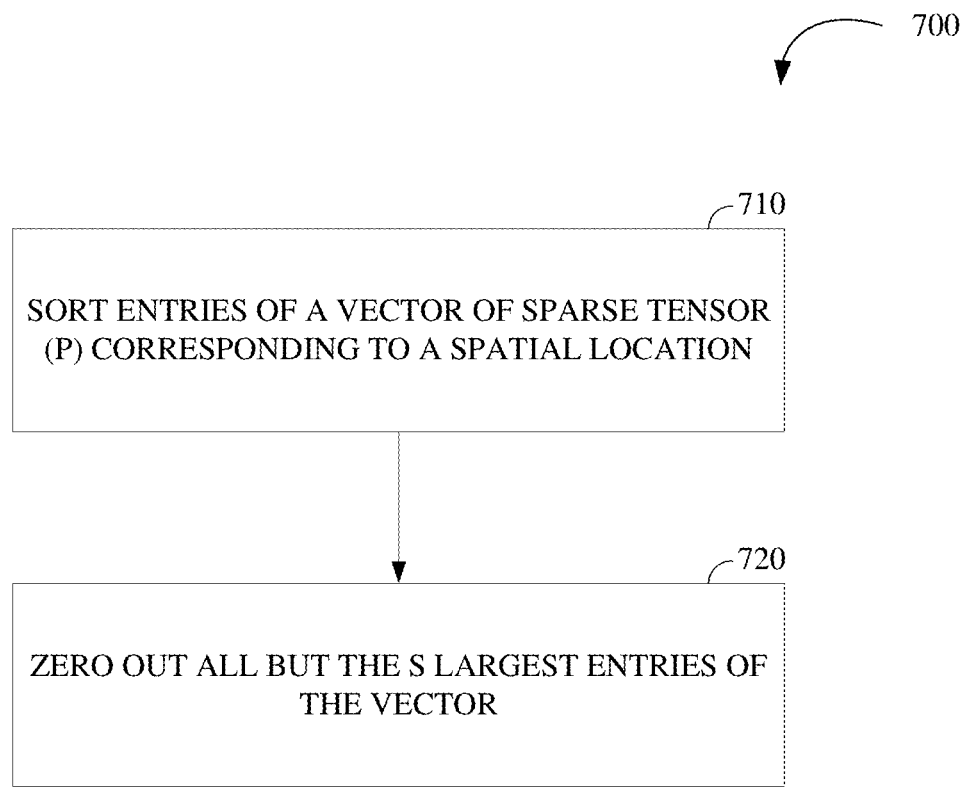
FIG. 7 is a flowchart of an example of a process for enforcing a sparsity constraint on lookup-based parameters during training of a convolutional neural network.

FIG. 7 is a flowchart of an example of a process 700 for enforcing a sparsity constraint on lookup-based parameters during training of a convolutional neural network. The process 700 includes sorting 710 entries of a vector of the sparse tensor P corresponding to a spatial location; and zeroing 720 out all but the largest entries of the vector of the sparse tensor P. The process 700 may be implemented by one or more layers of a convolutional neural network as part of training. For example, the process 700 may be implemented by a wearable device (e.g., including an augmented reality visor). For example, the process 700 may be implemented by the system 300 of FIG. 3A or the system 330 of FIG. 3B. For example, the process 700 may be implemented by an image capture device, such as the image capture device 310 shown in FIG. 3A. For example, the process 700 may be implemented by a personal computing device, such as the personal computing device 360.

The process 700 includes sorting 710 entries of a vector of the sparse tensor P corresponding to a spatial location. For example, the vector of the sparse tensor P may correspond to spatial location in an image (e.g., (row, column)). For example, the entries of the vector of the sparse tensor P may be sorted 710 based on their magnitudes.

The process 700 includes, zeroing 720 out all but the s largest entries of the vector of the sparse tensor (P), wherein s is a sparsity constraint. For example, the sparsity constraint may be selected to limit the complexity of the convolutional neural network to enable fast inference time performance. For example, the sparsity constraint may limit the number of non-zero entries of the vector of the sparse tensor P to 2, 3, 4, or 5 entries.

Figure 8:
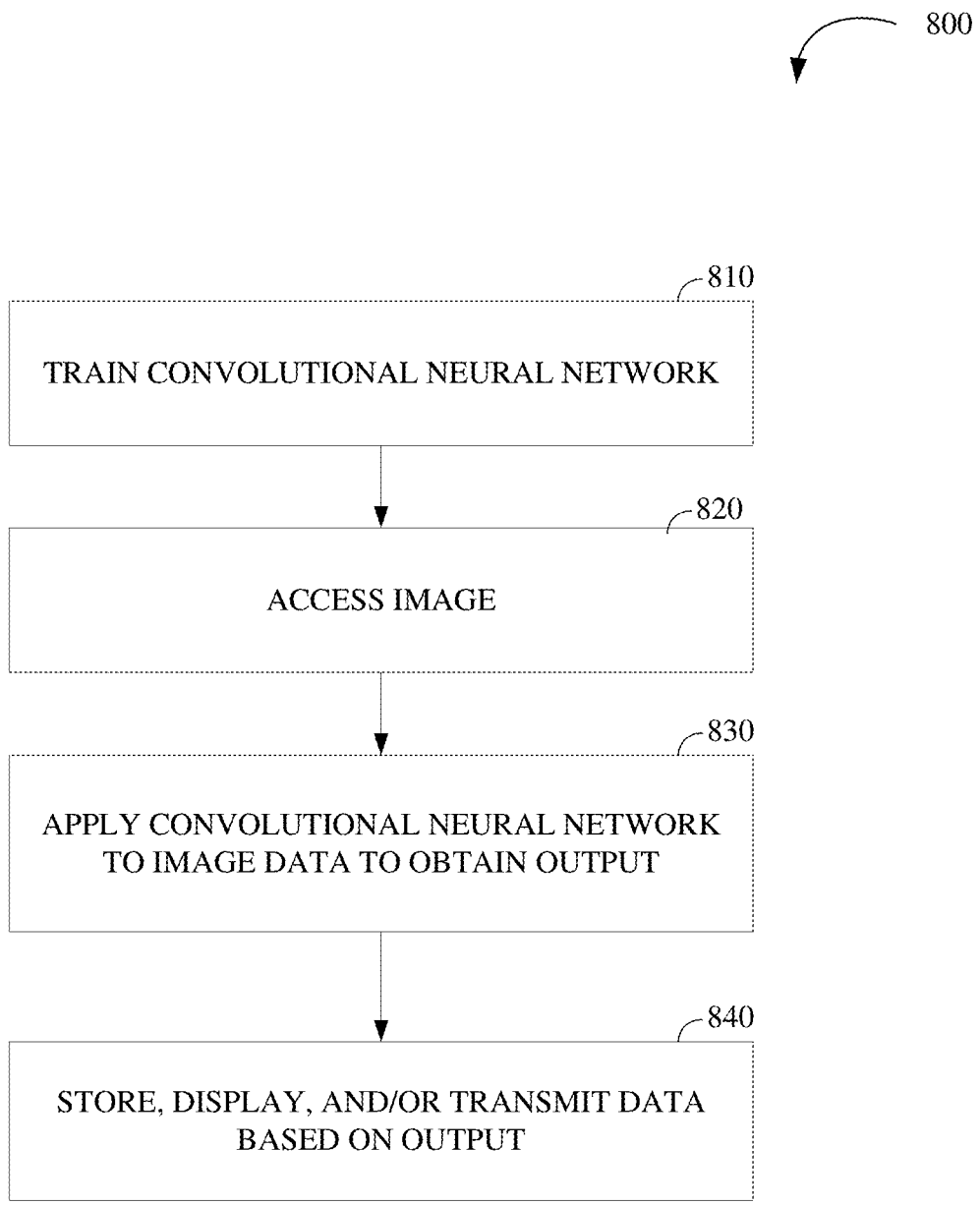
FIG. 8 is a flowchart of an example of a process for training a convolutional neural network to determine lookup-based parameters and using those parameters in an inference mode on an image.

FIG. 8 is a flowchart of an example of a process 800 for training a convolutional neural network to determine lookup-based parameters and using those parameters in an inference mode on an image. LCNN may enable online, in-field, and/or on-device training. For example, an end user's device (e.g., head-mounted display for virtual reality or augmented reality applications or another wearable computing device) may be able to train the convolutional neural network to adapt to new conditions despite possible computational resource constraints of their computing device. Thus the computing device, including a processing apparatus, may perform both training and inference time processing. The process 800 includes training 810 the convolutional neural network; accessing 820 an image; applying 830 the convolutional neural network to image data based on the image to obtain output; and storing, displaying, or transmitting 840 data based on the output of the convolutional neural network. For example, the process 800 may be implemented by a wearable device (e.g., including an augmented reality visor). For example, the process 800 may be implemented by the system 300 of FIG. 3A or the system 330 of FIG. 3B. For example, the process 800 may be implemented by an image capture device, such as the image capture device 310 shown in FIG. 3A. For example, the process 800 may be implemented by a personal computing device, such as the personal computing device 360.

The process 800 includes training 810 the convolutional neural network. For example, the convolutional neural network may be trained 810 using back-propagation to update a respective lookup index tensor I (e.g., the lookup index tensor I 120) and a respective lookup coefficient tensor C (e.g., the lookup coefficient tensor C 130) in multiple training iterations, while holding the dictionary D (e.g., the dictionary 110) of channel weight vectors fixed. For example, the process 600 of FIG. 6 may be implanted to train 810 the convolutional neural network.

The process 800 includes accessing 820 an image captured using an image sensor. The image sensor may be part of an image capture system (e.g., the image capture device 310, or the image capture device 340). In some implementations, the image sensor may be attached to a processing apparatus that implements the process 800. For example, the image may be accessed 820 by receiving the image from the image sensor via a bus. In some implementations, the image may be accessed 820 via a communications link (e.g., the communications link 350). For example, the image may be accessed 820 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the image may be accessed 820 via the communications interface 366. For example, the image may be accessed 820 as an input image signal, which may represent each pixel value in a defined format, such as in a RAW image format or a YUV image format. In some implementations, the image may be a frame of a video (i.e., one of a sequence of images of a video). In some implementations, the image is accessed 820 directly from the image sensor without intermediate image processing. In some implementations, the image is accessed 820 after being subjected to intermediate image processing (e.g., spatial noise reduction and/or temporal noise reduction). In some implementations, the image is accessed 820 by retrieving the image from a memory or other data storage apparatus.

The process 800 includes applying 830 a convolutional neural network to image data based on the image to obtain an output. A layer of the convolutional network may include filters with weights that are stored as a dictionary D (e.g., the dictionary 110) of channel weight vectors, a respective lookup index tensor I (e.g., the lookup index tensor I 120) that indexes the dictionary, and a respective lookup coefficient tensor C (e.g., the lookup coefficient tensor C 130). For example, the image data may include the image stored as an input tensor X. For example, the output may include the output is a classification of the image. For example, applying 830 the convolutional neural network may include implementing an inference time forward pass process (e.g., the process 200) with a layer of the convolutional neural network. For example, applying 830 the convolutional neural network may include convolving the channel weight vectors of the dictionary D with an input tensor X based on the image to obtain an input dictionary S (e.g., the input dictionary S 210), and combining entries of the input dictionary S that are indexed with indices from the respective lookup index tensor I and multiplied with corresponding coefficients from the respective lookup coefficient tensor C. In some implementations, a layer using the dictionary D is a first, input layer of the convolutional neural network, and the input tensor X may include input image data (e.g., RAW image data). In some implementations, a layer using the dictionary D is a second or deeper layer of the convolutional neural network, and the input tensor X may include activations or output from prior layers of the convolutional neural network that are based on the image. In some implementations, a layer using the dictionary D is a last or output layer of the convolutional neural network, and the output is a set of convolution results or activations from the layer (e.g., the output is a tensor Y=W*X+b). In some implementations, a layer using the dictionary D is a hidden layer of the convolutional neural network, and the output is a set of convolution results or activations from a subsequent layer (e.g., the output is a classification vector for the image or a portion of the image that results from processing of subsequent layers, which may include fully connected layers). In some implementations, only one layer of the convolutional neural network uses the dictionary D for inference time processing. In some implementations, multiple layers of the convolutional neural network uses the dictionary D for inference time processing. For example, a layer of the convolution neural network may implement a convolution operation in accordance with Equation 5. For example, applying 830 the convolutional neural network may include implementing the process 500 of FIG. 5.

The process 800 may include storing, displaying, or transmitting 840 data based on the output of the convolutional neural network. In some implementations, the data based on the output is an indication of one or more classes from a set of classes that are determined to best match the image or a portion of the image. In some implementations, the data based on the output is a filtered image based on the image and the output of the convolutional neural network. For example, the data based on the output may be transmitted 840 to an external device (e.g., a personal computing device) for display or storage. For example, the data based on the output may be stored 840 in memory of a processing apparatus (e.g., the processing apparatus 312 or the processing apparatus 362). For example, the data based on the output may be displayed 840 in the user interface 320 or in the user interface 364. For example, the data based on the output may be an image or text displayed 840 using a head-mounted display as part of an augmented reality application. For example, the data based on the output may be transmitted 840 via the communications interface 322.

The accuracy and the efficiency of LCNN may be evaluated under different settings. For example, the accuracy and speedup of the LCNN model relative to some conventional CNN architectures for the task of object classification may be evaluated on the standard image classification challenge of ImageNet, ILSRVC2012. The accuracy of the LCNN model under few-shot setting may also be evaluated. In some implementations, given a set of novel categories with as small as 1 training example per category, an LCNN model is able to learn a classifier that is both faster and more accurate than a standard CNN baseline. Dictionaries trained in an LCNN are generalizable and may be transferred to other networks. This may enable a higher accuracy in small number of iterations compared to standard CNN.

For example, convolutional layers of an LCNN may be initialized by Gaussian distributions, including for the sparse tensor P. The threshold in Equation 9 may be set for each layer in such a way as to maintain the same initial sparsity across all the layers. For example, the threshold of each layer may be set to be $\varepsilon = c \cdot \sigma$, where c is constant across layers and $\sigma$ is the standard deviation of a Gaussian initializer for that layer. In some implementations, c=0.01 for AlexNet and c=0.001 for ResNet. Similarly, to maintain the same level of sparsity across layers a $\lambda$ (Equation 8) may be used that is proportional to the standard deviation of the Gaussian initializers. For example, $\lambda = \lambda' \varepsilon$, may be used, where $\lambda'$ is constant across layers and $\varepsilon$ is the threshold value for that layer. For example, $\lambda' \in \{0.1, 0.2, 0.3\}$ may be used for both AlexNet and ResNet to get different sparsities in P.

The dictionary size k, the regularizer coefficient $\lambda$, and threshold value $\varepsilon$ may be three important hyperparameters for gaining speedup. The larger the dictionary is, the more accurate (but slower) the model becomes. The size of a dictionary for a first layer may be small as it is representing a 3-dimensional space. For the first layer, a dictionary size as small as 3 vectors may be sufficient for both AlexNet and ResNet. In contrast, fully connected layers of AlexNet are of higher dimensionality and a relatively large dictionary may be needed to cover the input space. For example, dictionary sizes 512 and 1024 may be proper for fully connected layers.

In AlexNet the same dictionary size may be used across other layers (e.g., k=100 or k=500). In an example implementation of ResNet, aside from the very first layer, all the other convolutional layers may be grouped into 4 types of ResNet blocks. The dimensionality of input may be equal between same ResNet block types, and may be doubled for consecutive different block types. In a similar way the dictionary size may be set for different ResNet blocks: equal between the same block types, and doubles for different consecutive block types. For example, the dictionary size of the first block may set to a value in the range from 16 to 128.

In some implementations, LCNN may achieve high efficiency and accuracy for the task of image classification. The lookup-based convolution is general and can be applied on any CNN architecture. For example, an AlexNet architecture or a ResNet architecture may be used. For example, the ImageNet challenge ILSVRC2012 may be used to evaluate the accuracy of the model. Standard top-1 and top-5 classification accuracy on 1K categories of objects in natural scenes may be used to evaluate performance of an LCNN for classification. Efficiency may be evaluated by comparing the number of floating point operations as a representation for speedup. In some implementations, the speed and the accuracy of LCNN may depend on two hyperparameters: 1) k, the dictionary size and 2) $\lambda$, which controls the sparsity of P; i.e. The average number of dictionary components in the linear combination. A trade-off can be set between the accuracy and the efficiency of LCNN by adjusting these two parameters. In some implementations, with small enough dictionaries and sparse linear combinations, LCNN may offer 37.6× speedup with the accuracy comparable to some prior systems. On the other hand, where the dictionaries are set to be large enough, LCNN can be as accurate as slower CNN architectures. In some implementations (dubbed LCNN-fast), the dictionary size of the mid-layer convolutions is 30 and for the fully connected layers is 512. In some implementations (dubbed LCNNaccurate), the mid-layer convolutions have a dictionary of size 500 and the size of dictionary in fully connected layers is 1024. For example, the regularizer constant $\lambda'$ for LCNN-fast and LCNNaccurate may be set to 0.3 and 0.1, respectively.

Depending on the dictionary size and $\lambda'$, LCNN can achieve various speedups and accuracies. For example, by tuning the dictionary size, LCNN may achieve a spectrum of speedups (e.g., from 3× to 38× relative to the original CNN model). The trend of speedup vs accuracy may be nearly linear. For example, a best fitted line may have a slope of −3.08, i.e., for each one percent accuracy that we sacrifice in top-1, we gain 3.08 more speedup.

LCNN may be used to improve ResNet-18. Some implementations may gain large speedups with a few points drop in the accuracy. For example, LCNN-fast may have dictionaries of size 16, 32, 64, and 128 for different block types. For example, LCNN-accurate may have larger dictionaries: 128, 256, 512 and 1024 for different block types.

LCNN may be employed for the task of few-shot learning. To evaluate the performance of LCNN on few-shot learning, we split the categories of ImageNet challenge ILSVRC2012 into two sets: i) base categories, a set of 990 categories which we use for pre-training, and ii) novel categories, a set of 10 categories that we use for few-shot learning. We do experiments under 1, 2, and 4 samples per category. We take two strategies for splitting the categories. One is random splitting, where we randomly split the dataset into 990 and 10 categories. We repeat the random splitting 5 times and report the average over all. The other strategy is to hold out all cats (7 categories), bicycles (2 categories) and sofa (1 category) for few-shot learning, and use the other 990 categories for pre-training. With this strategy we make sure that base and novel categories do not share similar objects, like different breeds of cats. For each split, we repeat the random sampling of 1, 2, and 4 training images per category 20 times, and get the average over all. Repeating the random sampling of the few examples is crucial for any few-shot learning experiment, since a model can easily overfit to a specific sampling of images.

LCNN may improve the performance of CNN and on few-shot learning. We first train an original AlexNet and an LCNN AlexNet on all training images of base categories (990 categories, 1000 images per category). We then replace the 990-way classification layer with a randomly initialized 10-way linear classifier. In CNN, this produces 10×4096 randomly initialized weights, on which we don't have any prior. These parameters need to be trained merely from the few examples. In LCNN, however, we transfer the dictionary trained in the 990-way classification layer to the new 10-way classifier. This reduces the number of randomly initialized parameters by at least a factor of 4. We use AlexNet LCNN-accurate model for few-shot learning. At the time of fine-tuning for few-shot categories, we keep the dictionaries in all layers fixed and only fine-tune the sparse P tensor. This reduces the total number of parameters that need to be fine-tuned by a factor of 14×. We use different learning rates $\eta$ and $\eta'$ for the randomly initialized classification layer (which needs to be fully trained) and the previous pre-trained layers (which only need to be fine-tuned). We tried $\eta'=\eta$, $\eta'=\eta/10$, $\eta'=\eta/100$ and $\eta'=0$ for both CNN and LCNN, then picked the best for each configuration. In some implementations, LCNN achieves better top-1 accuracy than a baseline CNN with 1, 2, or 4 examples per category.

Dictionaries in LCNN can be transferred from a shallower network to a deeper one. As a result, one can train fewer parameters (e.g., only I and C) in the deeper network with few iterations obtaining a higher test accuracy compared to a standard CNN. For example, a ResNet with 1 block of each type, 10 layers total, may be trained. Then the dictionaries of each layer may be transferred to its corresponding layer of ResNet-18 (with 18 layers). After transfer, the dictionaries may be kept fixed. Higher accuracy may be achieved in small number of iterations compared to standard CNN. The test accuracy of LCNN may be 16.2% higher than CNN at iteration 10K.

With recent advancements in virtual reality, augmented reality, and smart wearable devices, the need for getting the state of the art deep learning algorithms onto these resource constrained compute platforms may increase. Porting state of the art deep learning algorithms to resource constrained compute platforms may be extremely challenging. LCNN, a lookup-based convolutional neural network that encodes convolutions by few lookups to a dictionary that is trained to cover the space of weights in CNNs. Training LCNN may involve jointly learning a dictionary and a small set of linear combinations. The size of the dictionary may naturally trace a spectrum of trade-offs between efficiency and accuracy.

LCNN may enable efficient inference. LCNN can offer 3.2× speedup while achieving 55.1% top-1 accuracy using AlexNet architecture on the ImageNet challenge. For example, LCNN-fast may offer 37.6× speed up over AlexNet while maintaining 44.3% top-1 accuracy. LCNN not only offers dramatic speed ups at inference, but LCNN may also enable efficient training. On-device training of deep learning methods may require algorithms that can handle few-shot and few-iteration constraints. LCNN may address with these problems because the dictionaries are architecture agnostic and transferable across layers and architectures, enabling to only learning few linear combinations weights. In some implementations, dictionaries may be stored in low precision and/or as compact data structures.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. A system comprising:
an image sensor configured to capture images;
a fastening article attached to the image sensor and configured to mount the image sensor in proximity to a portion of a human body; and
a processing apparatus that is configured to:
  access an image captured using the image sensor;
  apply a convolutional neural network to image data based on the image to obtain an output, in which a layer of the convolutional network includes filters with weights that are stored as a dictionary (D) of channel weight vectors, a respective lookup index tensor (I) that indexes the dictionary, and a respective lookup coefficient tensor (C), and in which applying the convolutional neural network includes:
    convolving the channel weight vectors of the dictionary (D) with an input tensor based on the image to obtain an input dictionary (S), and
    combining entries of the input dictionary (S) that are indexed with indices from the respective lookup index tensor (I) and multiplied with corresponding coefficients from the respective lookup coefficient tensor (C); and
  store, display, or transmit data based on the output of the convolutional neural network.

2. The system of claim 1, in which the processing apparatus is configured to train the convolutional neural network by back-propagation using a sparse tensor (P), wherein non-zero entries of the sparse tensor (P) correspond to coefficients of the respective lookup coefficient tensor (C) at locations corresponding to indices of the respective lookup index tensor (I), and in which performing a training iteration comprises:
  convolving the channel weight vectors of the dictionary (D) with a training input tensor based on a training image to obtain a training input dictionary (S);
  convolving the training input dictionary (S) with the sparse tensor (P) to obtain training activations;
  determining a loss function based on the training activations; and
  updating the sparse tensor (P) based on the loss function.

3. The system of claim 1, in which the processing apparatus is configured to train the convolutional neural network using back-propagation to update the respective lookup index tensor (I) and the respective lookup coefficient tensor (C) in multiple training iterations, while holding the dictionary (D) of channel weight vectors fixed.

4. The system of claim 1, in which the processing apparatus is configured to determine the dictionary (D) of channel weight vectors by training a different neural network that includes the dictionary (D), wherein the different neural network has less layers than the convolutional neural network.

5. A method comprising:
applying a convolutional neural network to image data based on an image to obtain an output, in which a layer of the convolutional network includes filters with weights that are stored as a dictionary (D) of channel weight vectors, a respective lookup index tensor (I) that indexes the dictionary, and a respective lookup coefficient tensor (C), and in which applying the convolutional neural network includes:
convolving the channel weight vectors of the dictionary (D) with an input tensor based on the image to obtain an input dictionary (S), and
combining entries of the input dictionary (S) that are indexed with indices from the respective lookup index tensor (I) and multiplied with corresponding coefficients from the respective lookup coefficient tensor (C); and
storing, displaying, or transmitting data based on the output of the convolutional neural network.

6. The method of claim 5, comprising train the convolutional neural network by back-propagation using a sparse tensor (P), wherein non-zero entries of the sparse tensor (P) correspond to coefficients of the respective lookup coefficient tensor (C) at locations corresponding to indices of the respective lookup index tensor (I), and in which performing a training iteration comprises:
convolving the channel weight vectors of the dictionary (D) with a training input tensor based on a training image to obtain a training input dictionary (S);
convolving the training input dictionary (S) with the sparse tensor (P) to obtain training activations;
determining a loss function based on the training activations; and
updating the sparse tensor (P) based on the loss function.

7. The method of claim 6, in which the loss function includes a regularization term based on a norm of the sparse tensor (P).

8. The method of claim 6, in which the training iteration comprises:
sorting entries of a vector of the sparse tensor (P) corresponding to a spatial location; and
zeroing out all but the s largest entries of the vector of the sparse tensor (P), wherein s is a sparsity constraint.

9. The method of claim 6, in which the training iteration comprises:
applying a threshold function to entries of the sparse tensor (P).

10. The method of claim 6, in which the training iteration comprises:
back-propagating through a threshold function to determine a gradient with respect to the sparse tensor (P).

11. The method of claim 5, comprising training the convolutional neural network using back-propagation to update the respective lookup index tensor (I) and the respective lookup coefficient tensor (C) in multiple training iterations, while holding the dictionary (D) of channel weight vectors fixed.

12. The method of claim 5, in which the dictionary (D) of channel weight vectors is used in multiple layers of the convolutional neural network.

13. The method of claim 5, in which the dictionary (D) of channel weight vectors has been determined by training a different neural network that includes the dictionary (D), wherein the different neural network is a different depth than the convolutional neural network.

14. The method of claim 5, comprising determining the dictionary (D) of channel weight vectors by training a different neural network that includes the dictionary (D), wherein the different neural network has less layers than the convolutional neural network.

15. The method of claim 5, in which the output is a classification of the image.

16. A wearable device comprising:
a memory; and
a processor, wherein the memory stores instructions executable by the processor to cause the wearable device to:
apply a convolutional neural network to image data based on an image to obtain an output, in which a layer of the convolutional network includes filters with weights that are stored as a dictionary (D) of channel weight vectors, a respective lookup index tensor (I) that indexes the dictionary, and a respective lookup coefficient tensor (C), and in which applying the convolutional neural network includes:
convolving the channel weight vectors of the dictionary (D) with an input tensor based on the image to obtain an input dictionary (S), and
combining entries of the input dictionary (S) that are indexed with indices from the respective lookup index tensor (I) and multiplied with corresponding coefficients from the respective lookup coefficient tensor (C); and
store, display, or transmit data based on the output of the convolutional neural network.

17. The wearable device of claim 16, in which the memory stores instructions executable by the processor to cause the wearable device to train the convolutional neural network by back-propagation using a sparse tensor (P), wherein non-zero entries of the sparse tensor (P) correspond to coefficients of the respective lookup coefficient tensor (C) at locations corresponding to indices of the respective lookup index tensor (I), and in which performing a training iteration comprises:
convolving the channel weight vectors of the dictionary (D) with a training input tensor based on a training image to obtain a training input dictionary (S);
convolving the training input dictionary (S) with the sparse tensor (P) to obtain training activations;
determining a loss function based on the training activations; and
updating the sparse tensor (P) based on the loss function.

18. The wearable device of claim 16, in which the memory stores instructions executable by the processor to cause the wearable device to train the convolutional neural network using back-propagation to update the respective lookup index tensor (I) and the respective lookup coefficient tensor (C) in multiple training iterations, while holding the dictionary (D) of channel weight vectors fixed.

19. The wearable device of claim 16, in which the dictionary (D) of channel weight vectors is used in multiple layers of the convolutional neural network.

20. The wearable device of claim 16, in which the memory stores instructions executable by the processor to cause the wearable device to determine the dictionary (D) of channel weight vectors by training a different neural network that includes the dictionary (D), wherein the different neural network has less layers than the convolutional neural network.

* * * * *

UNITED STATES PATENT AND TRADEMARK OFFICE
CERTIFICATE OF CORRECTION

PATENT NO. : 10,691,975 B2
APPLICATION NO. : 16/038083
DATED : June 23, 2020
INVENTOR(S) : Hessam Bagherinezhad et al.

Page 1 of 1

It is certified that error appears in the above-identified patent and that said Letters Patent is hereby corrected as shown below:

In the Claims

Column 27, Line 46 (Claim 8), Replace "s" with --$s$--;

Column 27, Line 47 (Claim 8), Replace "s" with --$s$--.

Signed and Sealed this
Twenty-fifth Day of August, 2020

Andrei Iancu
*Director of the United States Patent and Trademark Office*